(12) United States Patent
Chiwata

(10) Patent No.: US 7,275,801 B2
(45) Date of Patent: Oct. 2, 2007

(54) IMAGE FORMING APPARATUS

(75) Inventor: Yuhei Chiwata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 260 days.

(21) Appl. No.: 11/174,461

(22) Filed: Jul. 6, 2005

(65) Prior Publication Data
US 2006/0007257 A1 Jan. 12, 2006

(30) Foreign Application Priority Data
Jul. 7, 2004 (JP) ............................ 2004-200450

(51) Int. Cl.
B41J 29/393 (2006.01)
(52) U.S. Cl. .......................................... 347/19; 347/15
(58) Field of Classification Search .................. 347/15, 347/19, 12, 41
See application file for complete search history.

(56) References Cited

U.S. PATENT DOCUMENTS

| 6,488,355 | B2 | 12/2002 | Nakamura et al. | |
| 6,779,870 | B2 | 8/2004 | Watanabe et al. | |
| 6,966,627 | B2* | 11/2005 | Escobedo et al. | 347/41 |
| 2003/0210297 | A1* | 11/2003 | Vanhooydonck et al. | 347/41 |
| 2005/0243128 | A1* | 11/2005 | Nakajima et al. | 347/41 |

FOREIGN PATENT DOCUMENTS

| JP | 4-39041 A | 2/1992 |
| JP | 2001-270155 A | 10/2001 |
| JP | 2001-334661 A | 12/2001 |
| JP | 2003-34020 A | 2/2003 |
| JP | 2004-106248 A | 4/2004 |

* cited by examiner

Primary Examiner—Lamson Nguyen
(74) Attorney, Agent, or Firm—Birch, Stewart, Kolasch & Birch, LLP

(57) ABSTRACT

The image forming apparatus comprises: a conveyance device which performs relative movement of an ejection head and a recording medium by conveying at least one of the ejection head and the recording medium in a uniform relative movement direction; the ejection head which includes ink ejection ports two-dimensionally arranged, the ejection head performing an ink ejection operation of ejecting ink droplets through the ink ejection ports toward the recording medium in conjunction with the relative movement performed by the conveyance device so as to compose a line-shaped dot row in a main scanning direction substantially perpendicular to the relative movement direction from dots formed by the ink droplets deposited on the recording medium, adjacent two of the dots being arranged to overlap at least partially with each other, one of pairs of adjacent two of the ink ejection ports being a maximum-landing-time-difference pair where a landing time difference between the adjacent two of the dots arranged in the line-shaped dot row is maximum, a pitch in the main scanning direction between the maximum-landing-time-difference pair being smaller than pitches in the main scanning direction of others of the pairs of adjacent two of the ink ejection ports; an ink quantity data generation device which generates ink quantity data on pixels from image data on print object; an ink quantity data correction device which corrects the ink quantity data on at least one of the pixels to be formed by the ink droplets ejected from at least one of the ink ejection ports of the maximum-landing-time-difference pair, in accordance with the ink quantity data generated by the ink quantity data generation device; and an ejection control device which controls the ink ejection operation of the ejection head in accordance with the ink quantity data on the pixels including the ink quantity data having been corrected by the ink quantity data correction device.

9 Claims, 15 Drawing Sheets

50(12K,12C,12LC,12M,12LM,12Y)

IMAGE FORMING APPARATUS

BACKGROUND OF THE INVENTION

1. Field of the Invention

The present invention relates to an image forming apparatus, and more particularly to an image forming apparatus such as an inkjet recording apparatus that forms images on a recording medium by using an ejection head in which a plurality of liquid droplet ejection ports (nozzles) are arranged two-dimensionally at high density.

2. Description of the Related Art

An inkjet recording apparatus forms images by means of ink dots, by causing ink to be ejected from a recording head (ejection head) having nozzles for ejecting ink, in accordance with a print signal, thereby depositing ink droplets on a recording medium, such as recording paper, while moving the recording medium relatively with respect to the recording head.

In order to achieve high-resolution printing of photographic image quality, it has been sought to arrange the nozzles at high density. In relation to this, Japanese Patent Application Publication No. 2001-334661 discloses technology for achieving high density of nozzles by arranging square or rhombus shaped pressure chambers corresponding to the nozzles in a two-dimensional matrix configuration.

However, if the nozzles are arranged at high density by using the technology disclosed in Japanese Patent Application Publication No. 2001-334661 and a full line type recording head having nozzle rows extending along a length corresponding to the entire printable width of the recording medium is composed, then non-uniformity of density may occur in the image of the print result, due to differences of coalescence degree of the liquid droplets on the recording medium resulting from differences in the droplet ejection time intervals between adjacent dots. This phenomenon and the causes thereof are described with reference to FIGS. 14A to 16C.

FIG. 14A is a schematic view showing an example of a nozzle arrangement in a conventional full line type inkjet head (hereinafter referred to as "head"). FIG. 14B is a schematic view showing a dot arrangement in a solid image formed by droplets ejected from this head. Although shown schematically in FIGS. 14A and 14B, this head 200 has a length corresponding to the full width of the recording medium (not shown), and is fixed in position so as to extend in a direction (the direction indicated by the arrow M in the drawings; namely, main scanning direction) that is substantially perpendicular to the direction of conveyance of the recording medium (the direction indicated by the arrow S in the drawings; namely, sub-scanning direction).

The nozzles A-i and B-i (i=1, 2, 3, ..., 6) forming the ink droplet ejection ports are arranged in a two-dimensional matrix configuration. More specifically, the nozzles A-i and B-i (i=1, 2, 3, ..., 6) are arranged in a row direction aligned with the direction indicated by the arrow M that is perpendicular to the conveyance direction of the recording medium indicated by the arrow S, and in an oblique column direction that has a prescribed non-perpendicular angle θ with respect to the row direction.

When the nozzles A-i and B-i (i=1, 2, 3, ..., 6) arranged in a matrix array as shown in FIG. 14A are driven, one line (a line formed of a row of dots or a line formed of a plurality of rows of dots) is printed in the direction perpendicular to the conveyance direction of the recording medium, by driving the nozzles (in other words, causing the nozzles to eject ink) sequentially from one end toward the other end in each of nozzle blocks. Each nozzle block is based on a unit formed by a group of nozzles aligned in the oblique column direction. Driving the nozzles in this way is defined as main scanning.

More specifically, taking the nozzles A-1, A-2, A-3, A-4, A-5 and A-6 in FIG. 14A to be one block (and taking nozzles B-1, ..., B-6 to be another block, and so on), one line is printed in the breadthways direction of the recording medium by sequentially driving the nozzles A-1, A-2, ..., A-6 in accordance with the conveyance speed of the recording medium.

On the other hand, "sub-scanning" is defined as to repeatedly perform printing of one line formed by the aforementioned main scanning, while the full-line head 200 and the recording medium are moved relatively to each other.

By ejecting droplets to form a solid image by means of the head 200 having the nozzle arrangement shown in FIG. 14A, the dot arrangement shown in FIG. 14B is obtained. However, a difference arises between the landing times of the droplets forming the dots that are adjacent to each other in the main scanning direction (the direction indicated by the arrow M).

More specifically, droplets are ejected to form a dot row aligned in the direction perpendicular to the direction of conveyance of the recording medium, by main scan driving concerning the nozzles A-i and B-i (i=1, 2, 3, ..., 6), in the sequence of the dot numbers 1, 2, 3, 4, 5, 6 in FIG. 14B. The droplets land onto the print medium in the same sequence of the dot numbers 1, 2, 3, 4, 5, 6 as mentioned above.

Taking the nozzle pitch in the main scanning direction in the head 200 to be L1, the nozzle pitch in the sub-scanning direction in the head 200 to be L2, and the conveyance speed of the recording medium to be U (m/s), then the difference in droplet ejection times between adjacent nozzles that eject droplets to form adjacent dots aligned in the main scanning direction (in other words, the difference between the landing times of the droplets forming the adjacent dots) will be L2/U. However, the difference in droplet ejection times at the return section of a nozzle block, in other words, the difference in droplet ejection times concerning dot "1" formed by a droplet ejected from the nozzle B-1 and dot "6" formed by a droplet ejected from the nozzle A-6 will be L3/U (in the example of FIG. 14A, L3=5×L2).

If droplets are ejected at very high speed, then the droplet ejection time interval L2/U becomes shorter than the fixing time of the droplets (namely, the time required for drying, permeation, solidification, and the like), and therefore coalescence of the droplets occurs on the recording medium. As shown in FIG. 15, while a droplet 221 that is deposited on the recording medium 216 to form a previous dot is not completely fixed (in a state where liquid ink is still present on the surface of the recording medium 216), if a droplet 222 is deposited to form a subsequent dot, then the subsequently deposited droplet 222 is attracted toward the previously deposited droplet 221 by surface tension, and the droplet 222 then unites with the droplet 221.

The droplet coalescence phenomenon described above occurs successively as the nozzles are driven in the main scanning action, and a similar coalescence phenomenon also occurs in the sub-scanning direction. Focusing on the liquid droplet ejected from a nozzle (for example, A-6) in the last row of the nozzle block described in FIG. 14A, the droplet forming the dot number "6" in FIG. 14B ejected from the nozzle A-6 makes contact with both a droplet forming the dot number "5" ejected from the nozzle A-5 and a droplet forming the dot number "1" ejected from the nozzle B-1. Since the landing time of the droplet forming the dot number "1" ejected from the nozzle B-1 is earlier than the landing time of the droplet forming the dot number "5" ejected from the nozzle A-5 (and droplet ejection timing of the nozzle B-1 is the same as that of the nozzle A-1), then the droplet forming the dot number "1" ejected from the nozzle B-1 is more fixed than the droplet forming the dot number "5" ejected from the nozzle A-5. Consequently, the droplet forming the dot number "6" ejected from the nozzle A-6 is attracted toward the droplet forming the dot number "5" ejected from the nozzle A-5 that is adjacent to the nozzle A-6 on the left-hand side, because the time difference between the ejecting time of the nozzle A-6 and the ejecting time of the nozzle A-5 is smaller than the time difference between the ejecting time of the nozzle A-6 and the ejecting time of the nozzle B-1.

FIG. 16A is a schematic view of an ideal dot arrangement in solid printing (the target landing positions in the drive control sequence). FIG. 16B is a schematic view showing the dot positions after the droplets have moved on the recording medium due to the aforementioned droplet coalescence phenomenon. FIG. 16C is a drawing showing a schematic view of the results of coalescence of a group of dots in the same column in the paper conveyance direction (the sub-scanning direction).

As shown in FIG. 16B, the distance wd' between the dots (dot numbers "6" and "1") formed by droplets ejected from the nozzles A-6 and B-1 is greater than the distances between the adjacent dots formed by droplets ejected from the other nozzles A-1 to A-6. Hence, a portion of lower density compared to the other portions is created in a position on the recording medium corresponding to the region between the nozzles A-6 and B-1.

Furthermore, if sub-scanning is performed along with conveying the recording medium, then the aforementioned phenomenon is similarly repeated in the sub-scanning direction. As a result of that, stripe-shaped unevenness having lower density such as that shown in FIG. 16C, occurs in a position corresponding to the region between the nozzles A-6 and B-1 (the so-called "return section" of the matrix head). The spatial repetition cycle of this stripe-shaped unevenness corresponds to the repetition cycle of the one column block that extends in the oblique column direction having an angle θ in the two-dimensional arrangement of nozzles A-i and B-i (i=1, 2, 3, . . . , 6) shown in FIG. 14A (the distance between the nozzle A-1 and the nozzle B-1, or the pitch of the nozzle blocks in the column direction).

The higher the dot density is, the more significant the degree of the coalescence is. Hence, stripe-shaped banding (unevenness) is a particular problem in the high-density regions.

A similar problem arises in the joint sections (the positions indicated by the arrows A) of a line head shown in FIG. 17, which is formed to a long length by joining together a plurality of short heads 230.

Japanese Patent Application Publication No. 2003-34020 discloses a composition for forming one long head by combining a plurality of relatively short inkjet heads, in which the distance between nozzles at joint sections are made shorter than the normal nozzle pitch, in such a manner that the occurrence of stripe-shaped non-uniformity in density is avoided at positions of the image corresponding to the joint sections between the short heads.

The method disclosed in Japanese Patent Application Publication No. 2003-34020 is effective in reducing unevenness in high-density image regions. However, in low-density regions, the degree of coalescence of the droplets is low, or alternatively, no coalescence occurs at all. Hence, as shown in FIGS. 18A and 18B, the dot density in the region of reduced nozzle pitch (the density in the regions indicated by the arrow B and the arrow B' in the drawings), is higher than that of the surrounding regions, and there is a problem in that this may appear adversely as a high-density stripe (black stripe). Japanese Patent Application Publication No. 2003-34020 does not refer to the problem of low-density regions.

Furthermore, the degree of coalescence of the liquid droplets on the recording medium varies depending on conditions such as the speed of the ejection, the type of recording medium, the properties of the ink, and therefore, the optimal nozzle-to-nozzle pitch varies also. If a long head is formed by joining together short heads, then it is possible to respond to change in conditions by applying a pitch adjustment function. However, in the case of an integrated matrix head, it is difficult to adjust the nozzle-to-nozzle pitch in accordance with change in the conditions.

SUMMARY OF THE INVENTION

The present invention has been contrived in view of the above-described circumstances, and an object thereof is to provide an image forming apparatus that is able to reduce non-uniformity of density due to a two-dimensional arrangement structure of ejection ports (nozzles) and difference between the landing times of adjacent dots caused by the arrangement of the ejection ports.

In order to attain the aforementioned object, the present invention is directed to an image forming apparatus, comprising: a conveyance device which performs relative movement of an ejection head and a recording medium by conveying at least one of the ejection head and the recording medium in a uniform relative movement direction; the ejection head which includes ink ejection ports two-dimensionally arranged, the ejection head performing an ink ejection operation of ejecting ink droplets through the ink ejection ports toward the recording medium in conjunction with the relative movement performed by the conveyance device so as to compose a line-shaped dot row in a main scanning direction substantially perpendicular to the relative movement direction from dots formed by the ink droplets deposited on the recording medium, adjacent two of the dots being arranged to overlap at least partially with each other, one of pairs of adjacent two of the ink ejection ports being a maximum-landing-time-difference pair where a landing time difference between the adjacent two of the dots arranged in the line-shaped dot row is maximum, a pitch in the main scanning direction between the maximum-landing-time-difference pair being smaller than pitches in the main scanning direction of others of the pairs of adjacent two of the ink ejection ports; an ink quantity data generation device which generates ink quantity data on pixels from image data on print object; an ink quantity data correction device which corrects the ink quantity data on at least one of the pixels to be formed by the ink droplets ejected from at least one of the ink ejection ports of the maximum-landing-time-difference pair, in accordance with the ink quantity data generated by the ink quantity data generation device; and an ejection control device which controls the ink ejection operation of the ejection head in accordance with the ink quantity data on the pixels including the ink quantity data having been corrected by the ink quantity data correction device.

According to the present invention, the pitch in the main scanning direction between the maximum-landing-time-difference pair of the ink ejection ports where the landing time difference concerning the adjacent dots in one of the dot rows formed along the uniform main scanning direction is maximum, is smaller than the pitches in the main scanning direction between the others of the pairs of the ink ejection ports. Thus, it is possible to reduce non-uniformity of the density caused by difference in the degree of coalescence of adjacent droplets arising in accordance with the difference between landing times (principally, non-uniformity in the density arising in a high-density region when ejecting droplets at high speed).

Furthermore, ink quantity data on each pixel is generated from the image data on the image to be printed by means of the ink quantity data generation device. In this case, the ink quantity data on the pixels corresponding to the return section is corrected in accordance with the value of the ink quantity data on the corresponding pixels by means of the ink quantity data correction device. For example, the ink quantity data is corrected by taking account of the difference between the pitch in the main scanning direction at the return section and the pitch in the main scanning direction between other ejection ports, in such a manner that the ink quantity per unit length is substantially equal. In this way, it is possible to suppress the occurrence of unevenness across the full density range from high-density regions to low-density regions, by controlling the ink ejection operation (ejection quantity, ejection timing, and the like) from the respective ejection ports on the basis of the corrected ink quantity data.

Preferably, the ink quantity data correction device has a correction coefficient table for determining a correction coefficient corresponding to the ink quantity data on the pixel to be corrected.

By using the correction coefficient table that determines correction quantities corresponding to the ink quantities of pixels to be corrected, it is possible to implement optimal correction of the respective ink quantity data from high-density regions through to low-density regions by means of a simple calculation process.

Preferably, the image forming apparatus further comprises: a test pattern output device which controls the ejection head and the conveyance device in such a manner that a prescribed test pattern is printed on the recording medium; an image reading device which reads in print results of the test pattern on the recording medium; and a table rewriting device which rewrites the correction coefficient table in accordance with information read in by means of the image reading device.

The extent of the coalescence of the ink deposited on the recording medium varies according to conditions such as the droplet ejection speed (printing speed), the type of recording medium (medium type), the ink properties, and the like. Thus, in order to achieve optimal correction in response to changes in the print conditions, desirably, a test pattern is printed, these print results are read in, non-uniformity in the density at the return section is measured from the information read, and the like, whereby the correction coefficient table is corrected on the basis of the information read in.

Preferably, the ink quantity data correction device corrects the ink quantity data in a range from low-density regions to medium-density regions in accordance with the following equation: $V'=X \times V$, where V is normalized ink quantity data before correction, X is the correction coefficient satisfying $0<X<1$, and V' is normalized ink quantity data after the correction.

The correction coefficient X in the low-density regions to the medium-density regions is taken to be $0<X<1$, and the ink quantity data V' after the correction is obtained by multiplying the ink quantity data V before the correction by the correction coefficient X. Thereby, it is possible to reduce the ink quantity data at the return section, and the ink quantities can be corrected adequately to be substantially equal in the return sections and the other sections. The term "low density" means, specifically, the density of the recording medium (for example, the recording paper, or the like) onto which no ink droplets are deposited.

Preferably, if a normalized ink quantity value obtained from the ink quantity data on the pixel to be corrected by normalizing into a range between 0 and 1 is not more than 0.5, then the ink quantity data correction device determines a correction coefficient X and corrects the ink quantity data in accordance with the following equations: $X=1/2+L1'/(2 \times L1)$, and $V'=X \times V$, where L1' is the pitch in the main scanning direction between the maximum-landing-time-difference pair of the ink ejection ports, L1 is the pitch in the main scanning direction of the others of the pairs of the ink ejection ports, V is normalized ink quantity data before correction, and V' is normalized ink quantity data after the correction.

In one aspect of the present invention, the correction coefficient X in a low-density region where the normalized ink quantity value is 0.5 or lower is given by $X=1/2+L1'/(2 \times L1)$, and the ink quantity data V' after the correction is obtained by multiplying the ink quantity data V before the correction by the correction coefficient X. Thereby, it is possible to correct the ink quantity adequately, in such a manner that the ink quantities are substantially equal in the return sections and the other sections.

Preferably, the ink ejection ports are arranged in a matrix configuration aligned in a row direction substantially perpendicular to the relative movement direction and in a column direction oblique to the row direction, and are divided into a plurality of blocks being aligned in the column direction; and the line-shaped dot row extending in the main scanning direction is formed by conducting an ejection driving for each of the plurality of blocks successively from the ink ejection port at one end side of each block toward the ink ejection port at the other end side of each block.

Preferably, the maximum-landing-time-difference pair of the ink ejection ports spans a boundary between adjacent two of the blocks.

These aspects of the invention are examples of the two-dimensional arrangement of the ejection ports. In the ejection head having an arrangement of this kind as described above, the region between the ejection ports at which there is maximum difference between the landing times of adjacent dots in the same line extending in the main scanning direction corresponds to the boundary section between the block of the ejection port columns aligned in the oblique column direction.

Preferably, a volume of the ink droplet ejected from the at least one of the ink ejection ports of the maximum-landing-time-difference pair is adjusted in accordance with the ink quantity data on each pixel including the ink quantity data having been corrected by the ink quantity data correction device.

As one mode for controlling the ink ejection operation on the basis of the ink quantity data corrected by the ink quantity data correction device, the liquid droplet volume of the dots ejected by the ejection ports to be corrected is corrected, in comparison with dots formed by the droplets ejected by normal ejection ports (that are not to be corrected).

Preferably, an ejection duty of the ink droplets ejected from the at least one of the ink ejection ports of the maximum-landing-time-difference pair is adjusted in accordance with the ink quantity data on each pixel including the ink quantity data having been corrected by the ink quantity data correction device.

As a further mode for controlling the ink ejection operation on the basis of the ink quantity data corrected by the ink quantity data correction device, the ejection duty (the number of ejected droplets) of the dots ejected by the ejection ports to be corrected is adjusted, in comparison with the normal ejection ports (that are not to be corrected).

A mode is also possible which combines the above correction of the liquid droplet volume and the above correction of the ejection duty.

As a compositional example of the ejection head in the image forming apparatus according to the present invention, a full line type inkjet head having a nozzle row in which a plurality of nozzles (ejection ports) for ejecting ink are arranged through a length corresponding to the full width of the recording medium can be used.

In this case, a mode may be adopted in which a plurality of relatively short ejection head blocks having a nozzle row that do not reach a length corresponding to the full width of the recording medium are combined and joined together, whereby a nozzle row of a length that corresponds to the full width of the recording medium can be formed.

A full line type inkjet head is usually disposed in a direction perpendicular to the relative feed direction (relative conveyance direction) of the recording medium. However, modes may also be adopted in which the inkjet head is disposed in an oblique direction that forms a certain angle with respect to the direction perpendicular to the relative conveyance direction.

The term "recording medium" indicates a medium on which an image is recorded by means of the action of the ejection head (this medium may also be called an ejection receiving medium, print medium, image formed medium, recorded medium, image receiving medium, or the like). This term includes various types of media, irrespective of material and size, such as continuous paper, cut paper, sealed paper, resin sheets such as OHP sheets, film, cloth, a printed circuit board on which a wiring pattern, or the like, is formed by means of an ejection head, and an intermediate transfer medium, and the like.

The conveyance device for causing the recording medium and the recording head to move relative to each other may includes a mode where the recording medium is conveyed with respect to a stationary (fixed) recording head, a mode where a recording head is moved with respect to a stationary recording medium, and a mode where both the ejection head and the recording medium are moved.

According to the present invention, in the arrangement of ejection ports in an ejection head, the pitch in the main scanning direction between ejection ports at which there is a maximum difference between the landing times of adjacent dots in a dot row formed so as to extend in one line in the main scanning direction (the pitch at a return section) is made shorter than the pitch in the main scanning direction between other ejection ports. Furthermore, when ink quantity data on respective pixels are generated from the image data on an image to be printed, the ink quantity data is corrected in respect of pixels that correspond to the return sections in the ejection port arrangement, and the ink ejection operation (ejection quantity, ejection timing, and the like) from the respective ejection ports is controlled on the basis of the corrected ink quantity data. Therefore, it is possible to reduce the occurrence of unevenness throughout the full density range, from high-density regions through to low-density regions.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Composition of Inkjet Recording Apparatus

Figure 1:
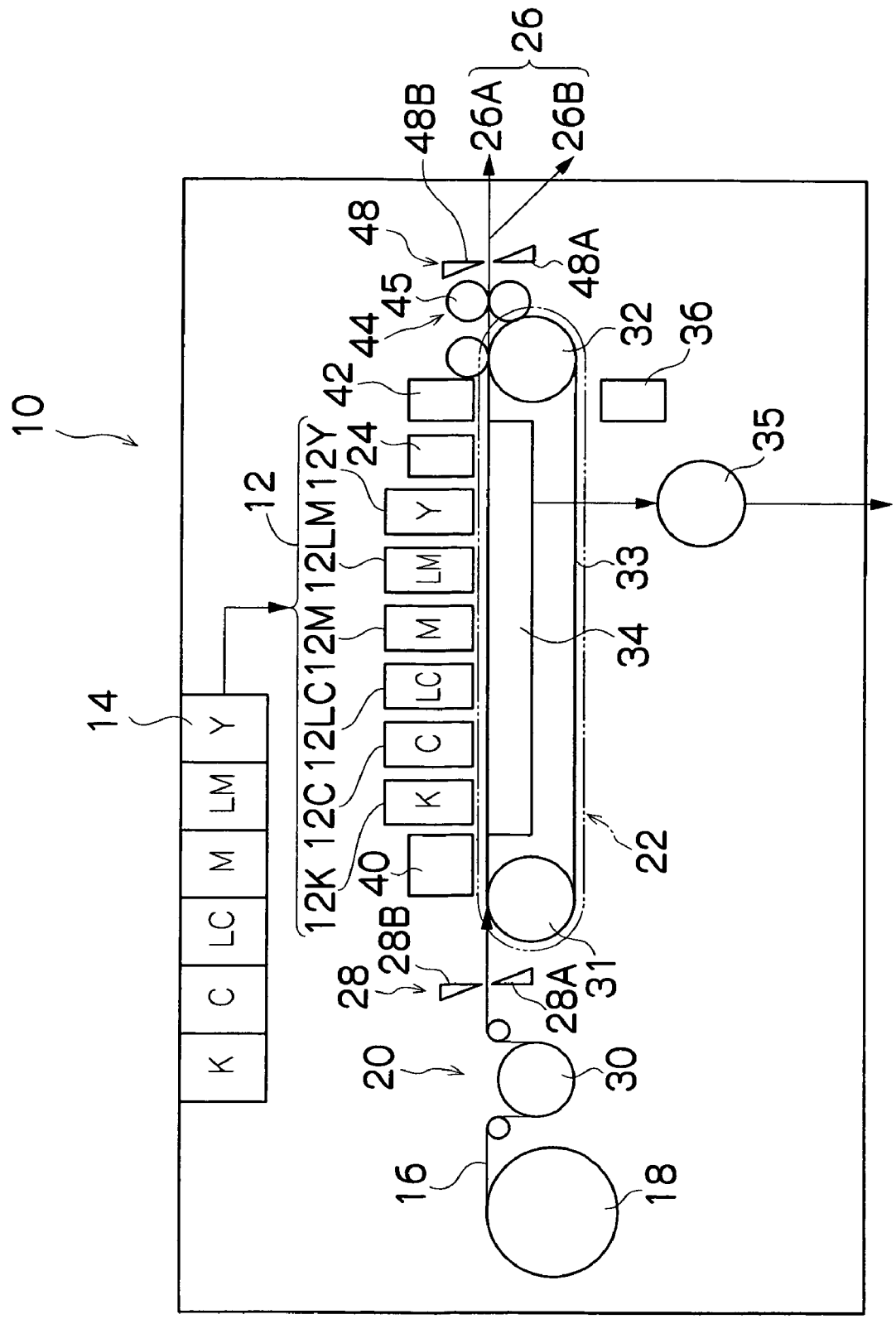
FIG. 1 is a general compositional view of an inkjet recording apparatus according to an embodiment of the present invention.

FIG. 1 is a diagram of the general composition of an inkjet recording apparatus (printer) relating to an embodiment of the present invention. As shown in FIG. 1, the inkjet recording apparatus 10 comprises: a printing unit 12 having a plurality of inkjet heads (hereinafter referred to as "heads") 12K, 12C, 12LC, 12M, 12LM and 12Y provided for ink colors of black (K), cyan (C), light cyan (LC), magenta (M), light magenta (LM) and yellow (Y), respectively; an ink storing and loading unit 14 for storing inks of K, C, M and Y to be supplied to the print heads 12K, 12C, 12LC, 12M, 12LM and 12Y; a paper supply unit 18 for supplying recording paper 16; a decurling unit 20 removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

The ink storing and loading unit 14 has ink tanks for storing the inks of respective colors corresponding to the heads 12K, 12C, 12LC, 12M, 12LM and 12Y, and the tanks are connected to the heads 12K, 12C, 12LC, 12M, 12LM and 12Y by means of prescribed channels. The ink storing and loading unit 14 also comprises a warning device (for example, a display device or an alarm sound generator) for warning when the remaining amount of any ink is low, and has a mechanism for preventing loading errors among the colors.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut papers are used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording paper 16 is held on the belt 33 by suction.

The belt 33 is driven in the clockwise direction in FIG. 1 by the motive force of a motor 88 (not shown in FIG. 1, but shown in FIG. 5) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there might be a problem in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

The heads 12K, 12C, 12LC, 12M, 12LM and 12Y of the printing unit 12 are full line heads having a length corresponding to the maximum width of the recording paper 16 used with the inkjet recording apparatus 10, and comprising a plurality of nozzles for ejecting ink arranged on a nozzle face through a length exceeding at least one edge of the maximum-size recording medium (the full width of the printable range).

The print heads 12K, 12C, 12LC, 12M, 12LM and 12Y are arranged in color order (black (K), cyan (C), light cyan (LC), magenta (M), light magenta (LM), yellow (Y)) from the upstream side in the conveyance direction (feed direction) of the recording paper 16, and these respective heads 12K, 12C, 12LC, 12M, 12LM and 12Y are fixed extending in a direction substantially perpendicular to the conveyance direction of the recording paper 16.

A color image can be formed on the recording paper 16 by ejecting inks of different colors from the heads 12K, 12C, 12LC, 12M, 12LM and 12Y, respectively, onto the recording paper 16 while the recording paper 16 is conveyed by the suction belt conveyance unit 22.

By adopting a configuration in which the full line heads 12K, 12C, 12LC, 12M, 12LM and 12Y having nozzle rows covering the full paper width are provided for the respective colors in this way, it is possible to record an image on the full surface of the recording paper 16 by performing just one operation of relatively moving the recording paper 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

The present embodiment relates to a six-color configuration including the colors of light cyan (LC) and light magenta (LM) in addition to the standard four colors of K, C, M and Y, but the present embodiment is not limited in terms of the combination of ink colors or the number of ink colors used. For example, it is also possible to adopt a configuration in which other light inks or dark inks are added, or other special inks, such as red or blue, are added, and a configuration may also be adopted in which any of the ink colors is removed. The number of heads is selected according to the number of colors used, but it is not always necessary to provide one head per color, and it is also possible to provide a plurality of heads that eject ink of the same color, or to provide nozzle rows ejecting inks of different colors within the same head. Furthermore, there are no particular restrictions of the sequence in which the heads of respective colors are arranged.

The print determination unit 24 shown in FIG. 1 has an image sensor for capturing an image of the ink-droplet deposition result of the print unit 12, and functions as a device to check for ejection defects such as blocking of the nozzles in the print unit 12 on the basis of the ink-droplet deposition results evaluated by the image sensor. Furthermore, the print determination unit 24 may also function as a device for measuring non-uniformities in density by reading in the print results for a plurality of test patterns having different recording densities (dot densities). These measurement results are reflected on a correction coefficient determination table of the ink quantity data described later.

The print determination unit 24 of the present embodiment is configured with at least a line sensor having rows of photoelectric transducing elements with a width that is greater than the ink-droplet ejection width (image recording width) of the heads 12K, 12C, 12LC, 12M, 12LM and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements that are arranged two-dimensionally.

A test pattern or the target image printed by the print heads 12K, 12C, 12LC, 12M, 12LM and 12Y of the respective colors is read in by the print determination unit 24, and the ejection performed by each head is determined. The ejection determination includes detection of the ejection, measurement of the dot size, and measurement of the dot formation position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print (test pattern print) are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Structure of the Head

Next, the structure of a head is described. The heads 12K, 12C, 12LC, 12M, 12LM and 12Y of the respective ink colors have the same structure, and a reference numeral 50 is hereinafter designated to any of the heads.

Figure 2A:
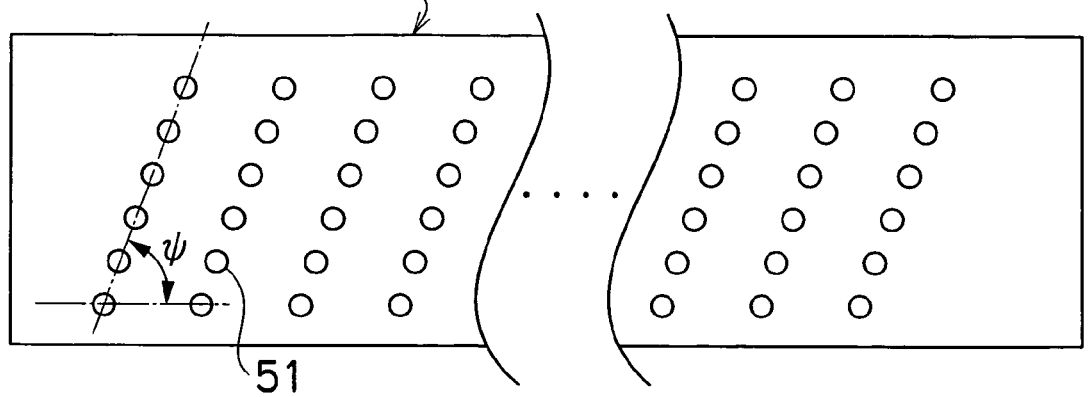
FIG. 2A is a plan view showing an example of the nozzle arrangement in a print head.
Figure 2B:
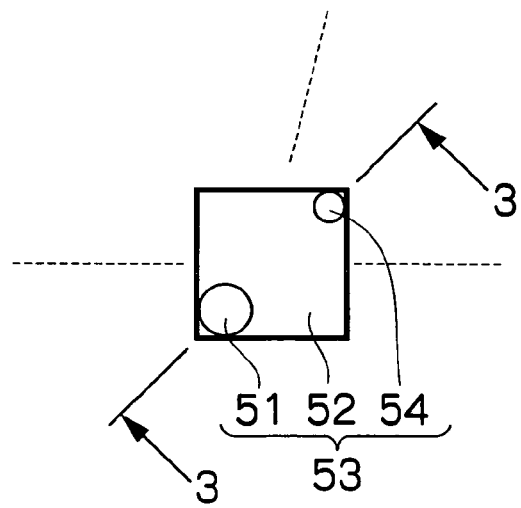
FIG. 2B is an enlarged view of one liquid droplet ejection element (an ink chamber unit corresponding to one nozzle)
Figure 3:
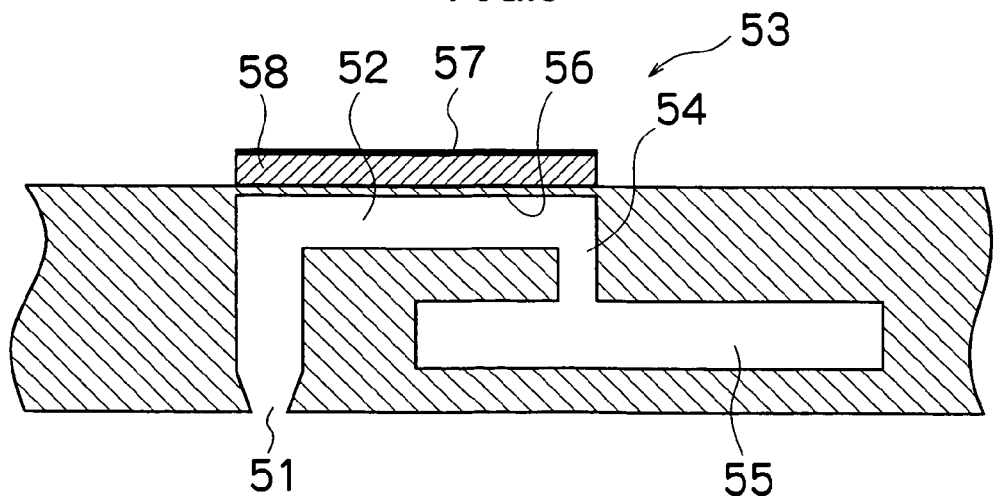
FIG. 3 is a cross-sectional view along line 3-3 in FIG. 2B.

FIG. 2A is a plan view showing an example of the nozzle arrangement in the head 50, and FIG. 2B is an enlarged view of one liquid droplet ejection element (an ink chamber unit corresponding to one nozzle). Furthermore, FIG. 3 is a cross-sectional view along line 3-3 in FIG. 2B.

As shown in FIG. 2A, the head 50 according to the present embodiment has a structure in which a plurality of nozzles 51 are arranged in a matrix configuration at a regular arrangement interval, in a row direction aligned with the lengthwise direction of the head (the main scanning direction; a direction perpendicular to the paper feed direction), and an oblique column direction having a uniform non-perpendicular angle of (P with respect to the main scanning direction. Although FIG. 2A provides a schematic view, by means of this composition, it is possible to achieve a nozzle composition of high density, in which the nozzle columns projected to an alignment in the main scanning direction reach a total of 2400 per inch (2400 nozzles per inch).

As shown in FIG. 2B, the nozzle arrangement in the head 50 shown in FIG. 2A is achieved by arranging nozzles 51, which are ink droplet ejection ports, and ink chamber units 53, which comprise pressure chambers 52 corresponding to each respective nozzle 51, in a two-dimensional matrix configuration. Reference numeral 54 indicates a supply port for supplying ink to the pressure chamber 52.

The planar shape of the pressure chamber 52 provided for each nozzle 51 is substantially a square, and an outlet to the nozzle 51 and an inlet of supplied ink (supply port 54) are provided in both corners on a diagonal line of the square.

As shown in FIG. 3, each pressure chamber 52 is connected to a common channel 55 through the supply port 54. The common channel 55 is connected to an ink tank 60 (not shown in FIG. 3, but shown in FIG. 4), which is a base tank that supplies ink, and the ink supplied from the ink tank 60 is delivered through the common flow channel 55 in FIG. 3 to the pressure chambers 52.

An actuator 58 provided with an individual electrode 57 is bonded to a pressure plate 56 (a diaphragm that also serves as a common electrode) which forms the ceiling of the pressure chamber 52. When a drive voltage is applied to the individual electrode 57, the actuator 58 is deformed, the volume of the pressure chamber 52 is thereby changed, and the pressure in the pressure chamber 52 is thereby changed, so that the ink inside the pressure chamber 52 is thus ejected through the nozzle 51. The actuator 58 is preferably a piezoelectric element. When ink is ejected, new ink is supplied to the pressure chamber 52 from the common flow channel 55 through the supply port 54.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Configuration of Ink Supply System

Figure 4:
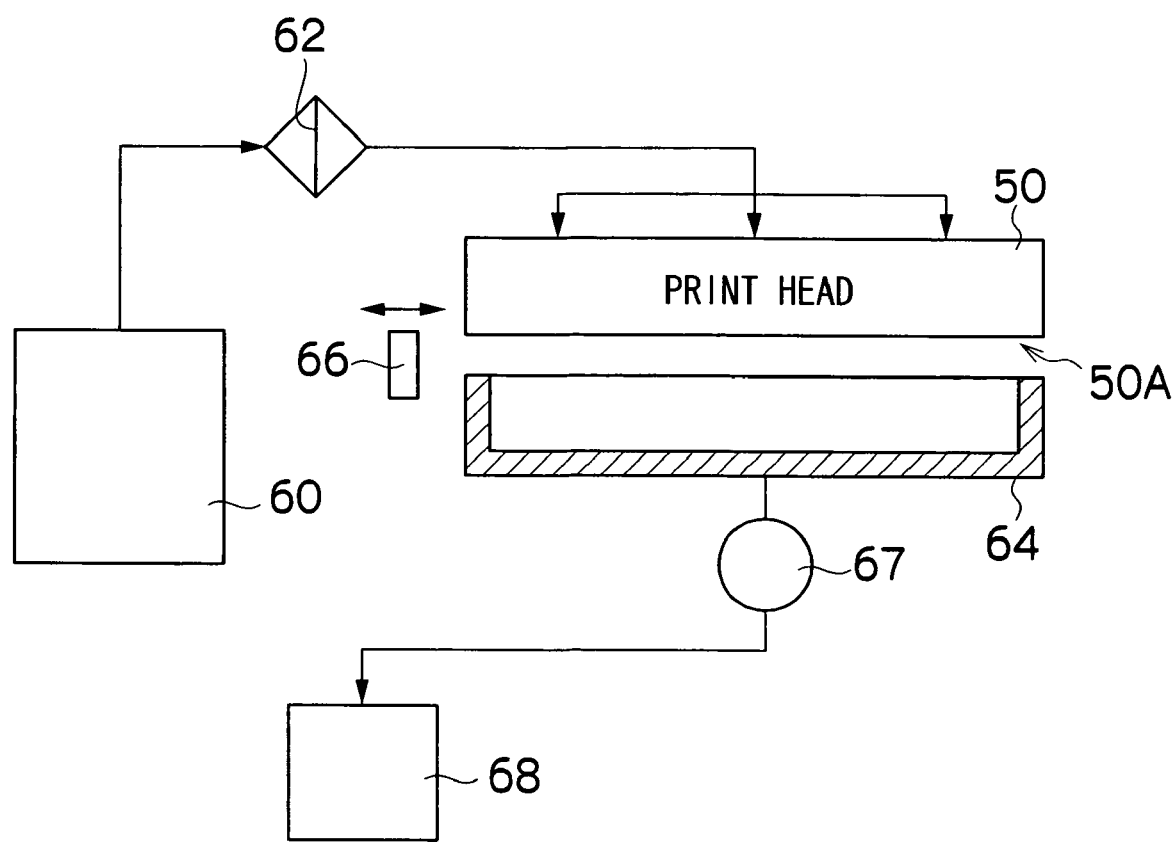
FIG. 4 is a schematic drawing showing the composition of an ink supply system in the inkjet recording apparatus.

FIG. 4 is a schematic drawing showing the configuration of the ink supply system in the inkjet recording apparatus 10. The ink tank 60 is a base tank that supplies ink to the head 50 and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink tank 60 in FIG. 4 is equivalent to the ink storing and loading unit 14 in FIG. 1 described above.

A filter 62 for removing foreign matters and bubbles is disposed between the ink tank 60 and the head 50 as shown in FIG. 4. The filter mesh size in the filter 62 is preferably equivalent to or less than the diameter of the nozzle and commonly about 20 μm. Although not shown in FIG. 4, it is preferable to provide a sub-tank integrally to the print head 50 or nearby the head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit including the cap 64 and the cleaning blade 66 can be relatively moved with respect to the head 50 by a movement mechanism (not shown), and is moved from a predetermined holding position to a maintenance position below the head 50 as required.

The cap 64 is displaced up and down relatively with respect to the head 50 by an elevator mechanism (not shown). When the power of the inkjet recording apparatus 10 is turned OFF or when in a print standby state, the cap 64 is raised to a predetermined elevated position so as to come into close contact with the head 50, and the nozzle face 50A is thereby covered with the cap 64.

The cleaning blade 66 is composed of rubber or another elastic member, and can slide on the ink ejection surface (surface of the nozzle plate) of the head 50 by means of a blade movement mechanism (not shown). When ink droplets or foreign matter has adhered to the nozzle plate, the surface of the nozzle plate is wiped and cleaned by sliding the cleaning blade 66 on the nozzle plate.

During printing or standby, when the frequency of use of specific nozzles is reduced and ink viscosity increases in the vicinity of the nozzles, a preliminary discharge is made to eject the degraded ink toward the cap 64.

Also, when bubbles have become intermixed in the ink inside the head 50 (inside the pressure chamber 52), the cap 64 is placed on the head 50, the ink inside the pressure chamber 52 (the ink in which bubbles have become intermixed) is removed by suction with a suction pump 67, and the suction-removed ink is sent to a collection tank 68. This suction action entails the suctioning of degraded ink whose viscosity has increased (hardened) also when initially loaded into the head 50, or when service has started after a long period of being stopped.

When a state in which ink is not ejected from the head 50 continues for a certain amount of time or longer, the ink solvent in the vicinity of the nozzles 51 evaporates and ink viscosity increases. In such a state, ink can no longer be ejected from the nozzle 51 even if the actuator 58 for the ejection driving is operated. Before reaching such a state (in a viscosity range that allows ejection by the operation of the actuator 58) the actuator 58 is operated to perform the preliminary discharge to eject the ink whose viscosity has increased in the vicinity of the nozzle toward the ink receptor. After the nozzle surface is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation.

The preliminary discharge is also referred to as "dummy discharge", "purge", "liquid discharge", and so on.

When bubbles have become intermixed in the nozzle 51 or the pressure chamber 52, or when the ink viscosity inside the nozzle 51 has increased over a certain level, ink can no longer be ejected by the preliminary discharge, and a suctioning action is carried out as follows.

More specifically, when bubbles have become intermixed in the ink inside the nozzle 51 and the pressure chamber 52, ink can no longer be ejected from the nozzle 51 even if the actuator 58 is operated. Also, when the ink viscosity inside the nozzle 51 has increased over a certain level, ink can no longer be ejected from the nozzle 51 even if the actuator 58 is operated. In these cases, a suctioning device to remove the ink inside the pressure chamber 52 by suction with a suction pump, or the like, is placed on the nozzle face 50A of the head 50, and the ink in which bubbles have become intermixed or the ink whose viscosity has increased is removed by suction.

However, since this suction action is performed with respect to all the ink in the pressure chambers 52, the amount of ink consumption is considerable. Therefore, a preferred aspect is one in which a preliminary discharge is performed when the increase in the viscosity of the ink is small.

Description of Control System

Figure 5:
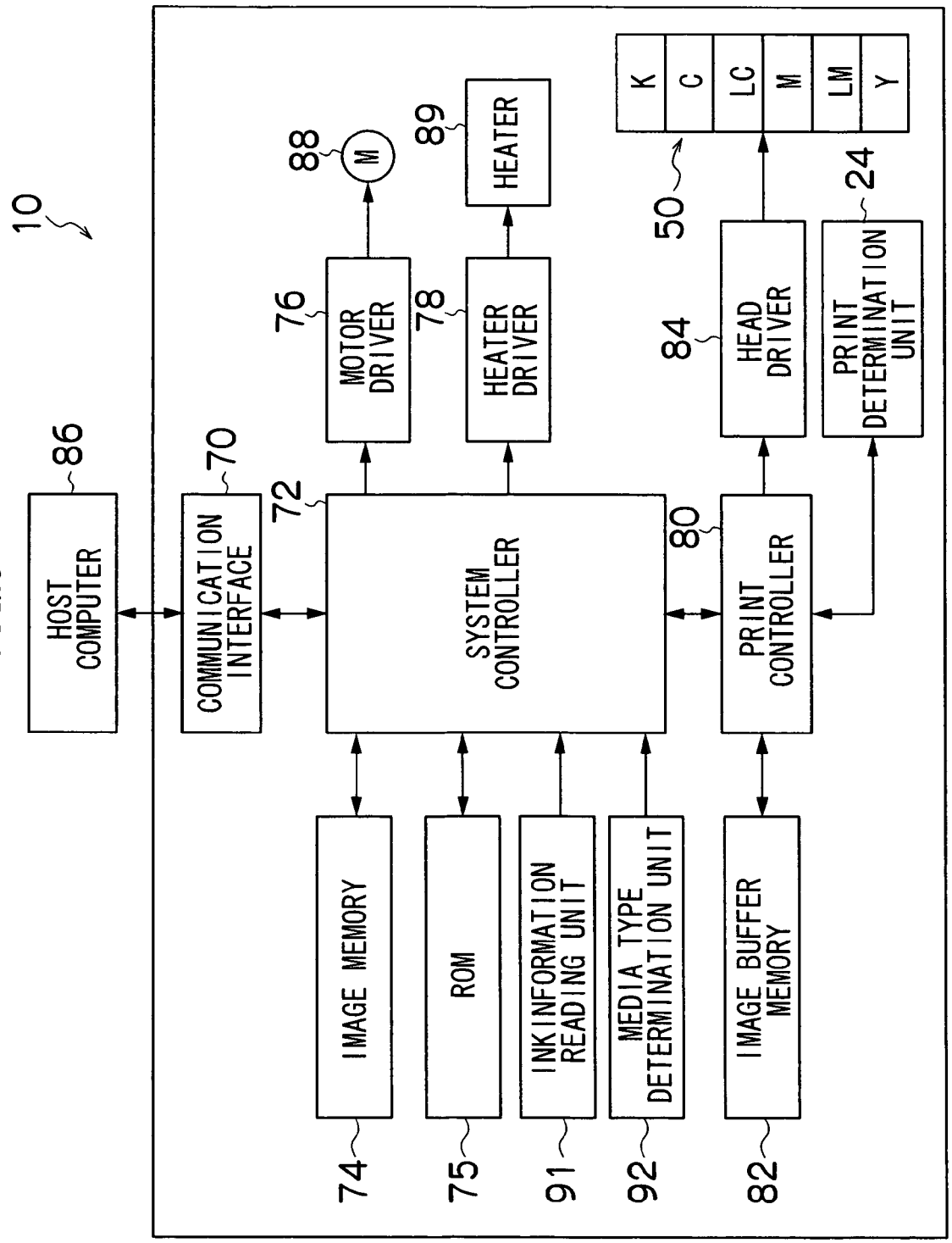
FIG. 5 is a principal block diagram showing the system composition of the inkjet recording apparatus.

FIG. 5 is a principal block diagram showing the system configuration of the inkjet recording apparatus 10. The inkjet recording apparatus 10 comprises a communication interface 70, a system controller 72, an image memory 74, a ROM 75, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, as well as controlling communications with the host computer 86 and writing and reading to and from the image memory 74, and it also generates control signals for controlling the motor 88 and heater 89 of the conveyance system.

The program executed by the CPU of the system controller 72 and the various types of data that are required for control procedures are stored in the ROM 75. The ROM 75 may be a non-rewritable storage device, or it may be a rewritable storage device, such as an EEPROM. The image memory 74 is used as a temporary storage region for the image data, and it is also used as a program development region and a calculation work region for the CPU.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to supply the generated print data (dot data) to the head driver 84. Prescribed signal processing is carried out in the print controller 80, and the ejection amount and the ejection timing of the ink droplets from the respective print heads 50 are controlled via the head driver 84, on the basis of the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 5 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the actuators 58 of the heads 50 of the respective colors on the basis of print data supplied by the print controller 80. The head driver 84 can be provided with a feedback control system for maintaining constant drive conditions for the print heads.

The image data to be printed is externally inputted through the communication interface 70, and is stored in the image memory 74. In this stage, the RGB image data is stored in the image memory 74.

The image data stored in the image memory 74 is sent to the print controller 80 through the system controller 72, and the dot data on each ink color is generated from the image data by a half-toning technique, such as error diffusion, in the print controller 80. In the inkjet recording apparatus 10, an image that appears to have a quasi-continuous tonal gradation to the human eye is formed by changing the droplet ejection density and the dot size of fine dots created by the ink (coloring material). Thus, it is necessary to generate a dot pattern that reproduces the tonal gradations of the image (the light and shade toning of the image) as faithfully as possible on the basis of the input digital image.

In other words, the print controller 80 performs processing for creating dot data on the six colors of K, C, LC, M, LM and Y from the input RGB image data. The dot data generated by the print controller 80 is stored in the image buffer memory 82.

The head driver 84 generates drive control signals for the head 50 on the basis of the dot data stored in the image buffer memory 82. By supplying the drive control signals generated by the head driver 84 to the head 50, ink is ejected from the head 50. By controlling ink ejection from the heads 50 in synchronization with the conveyance velocity of the recording paper 16, an image is formed on the recording paper 16.

The print determination unit 24 is a block that includes the line sensor as described above with reference to FIG. 1, reads the image printed on the recording paper 16, determines the print conditions (presence of the ejection, variation in the dot formation, optical density, and the like) by performing signal processing required, or the like, and provides the determination results of the print conditions to the print controller 80.

The print controller 80 makes various corrections with respect to the head 50 on the basis of information obtained from the print determination unit 24, if required. The system controller 72 implements control for carrying out preliminary ejection, suctioning, and other prescribed restoring processes, on the basis of the information obtained from the print determination unit 24. The system controller 72 carries out processing for optimizing the correction coefficient determination table described later.

In addition, the inkjet recording apparatus 10 according to the present embodiment comprises an ink information reading unit 91 and a media type determination unit 92. The ink information reading unit 91 is a device for reading in information about the ink type. More specifically, it is possible to use, for example, a device that reads in ink properties information from the shape of the cartridge in the ink tank 60 (a specific shape that allows the ink type to be identified), or from a bar code and/or IC chip incorporated into the cartridge. Besides this, it is also possible for an operator to input the required information by means of a user interface.

The media type determination unit 92 is a device for determining the type and size of the recording medium. This section uses, for example, a device for reading in information such as bar codes attached to the magazine in the media supply unit, or sensors disposed at a suitable position in the paper conveyance path (a paper width determination sensor, a sensor for determining the thickness of the paper, a sensor for determining the reflectivity of the paper, and so on). A suitable combination of these elements may also be used. Furthermore, it is also possible to adopt a composition in which information about the paper type, size, or the like, is specified by means of an input via a prescribed user interface, instead of or in conjunction with such automatic determining devices.

The information obtained by the ink information reading unit 91 and the media type determination unit 92 is supplied to the system controller 72, and is used for optimizing the correction coefficient of ejecting ink quantities, controlling ejection, and so on.

Description of Nozzle Arrangement and Ejection Control

Figure 6A:
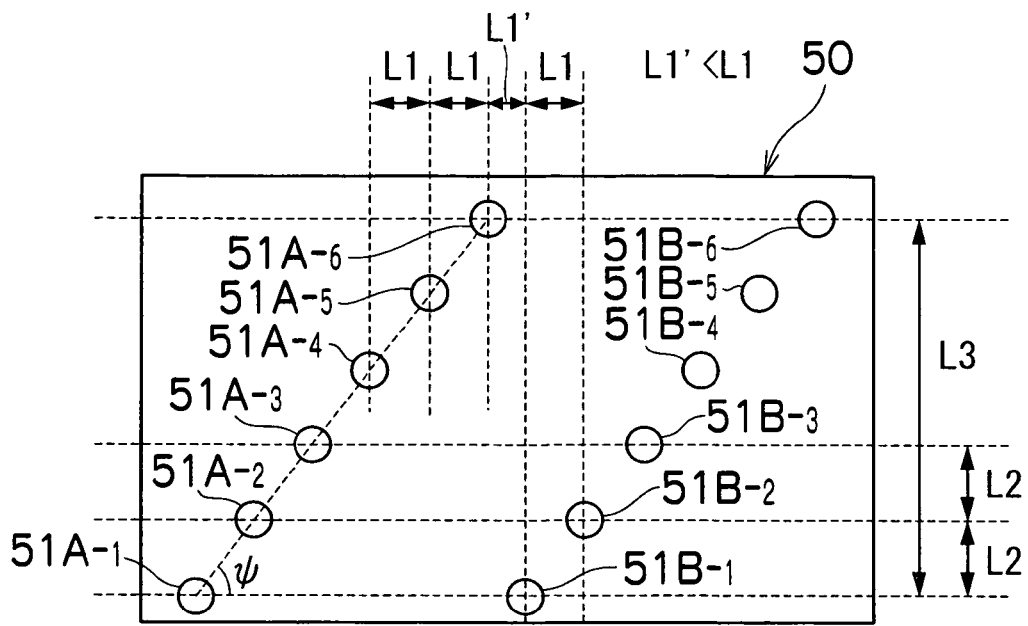
FIG. 6A is a schematic view showing an example of a nozzle arrangement in the print head.
Figure 6B:
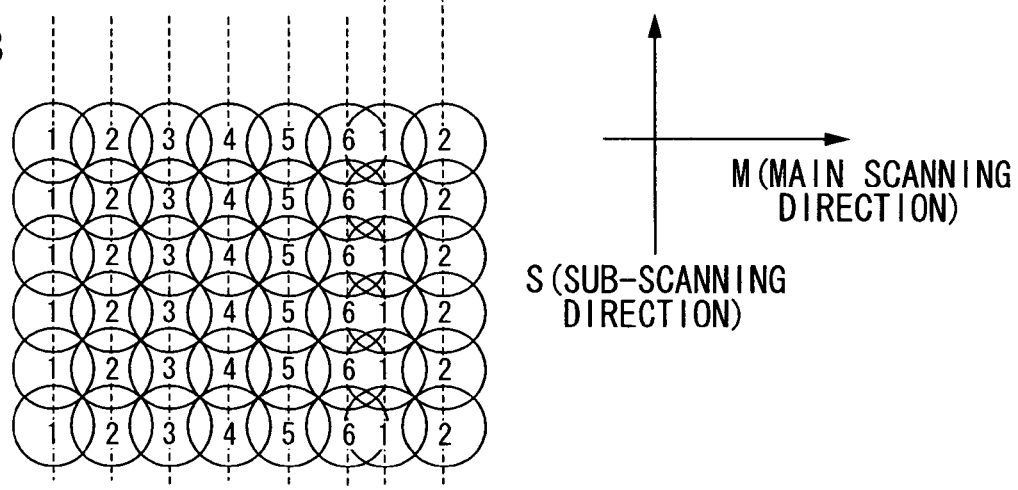
FIG. 6B is a schematic view showing a dot arrangement in a solid image formed by droplets ejected from the head.

FIG. 6A is a schematic view showing an example of a nozzle arrangement in a head 50 used in the inkjet recording apparatus 10 according to the present embodiment. FIG. 6B is a schematic view showing a dot arrangement for a solid image formed by droplets ejected from this head 50.

As shown in FIG. 6A, the nozzles 51A-i, 51B-i (i=1, 2, 3, ..., 6) having the ink droplet ejection ports are arranged in a row direction aligned with a direction (main scanning direction, indicated by the arrow M) that is perpendicular to the conveyance direction (sub-scanning direction, indicated by the arrow S) of the recording medium (not shown) as well as in an oblique column direction that has a constant non-perpendicular angle Φ with respect to the row direction, so as to be arranged in a two-dimensional matrix configuration.

Figure 14A:
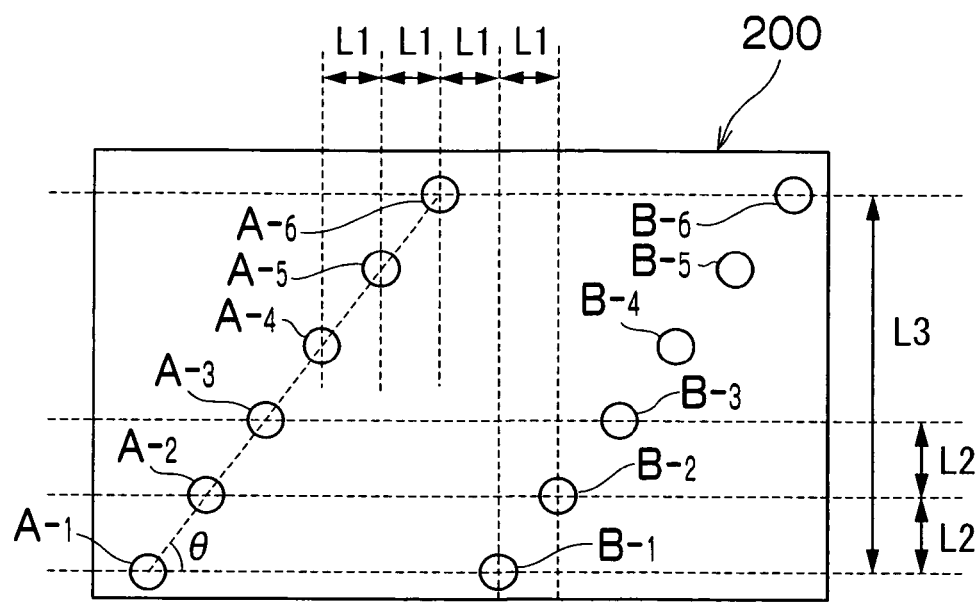
FIG. 14A is a schematic view showing an example of a nozzle arrangement in a conventional full line type inkjet head.
Figure 14B:
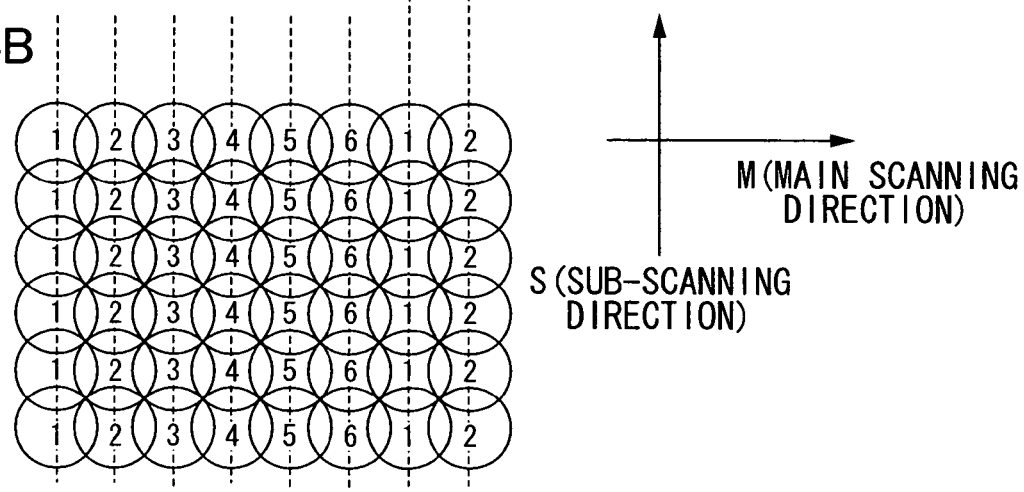
FIG. 14B is a schematic view showing a dot arrangement of a solid image formed by droplets ejected from the head shown in FIG. 14A.
Figure 15:
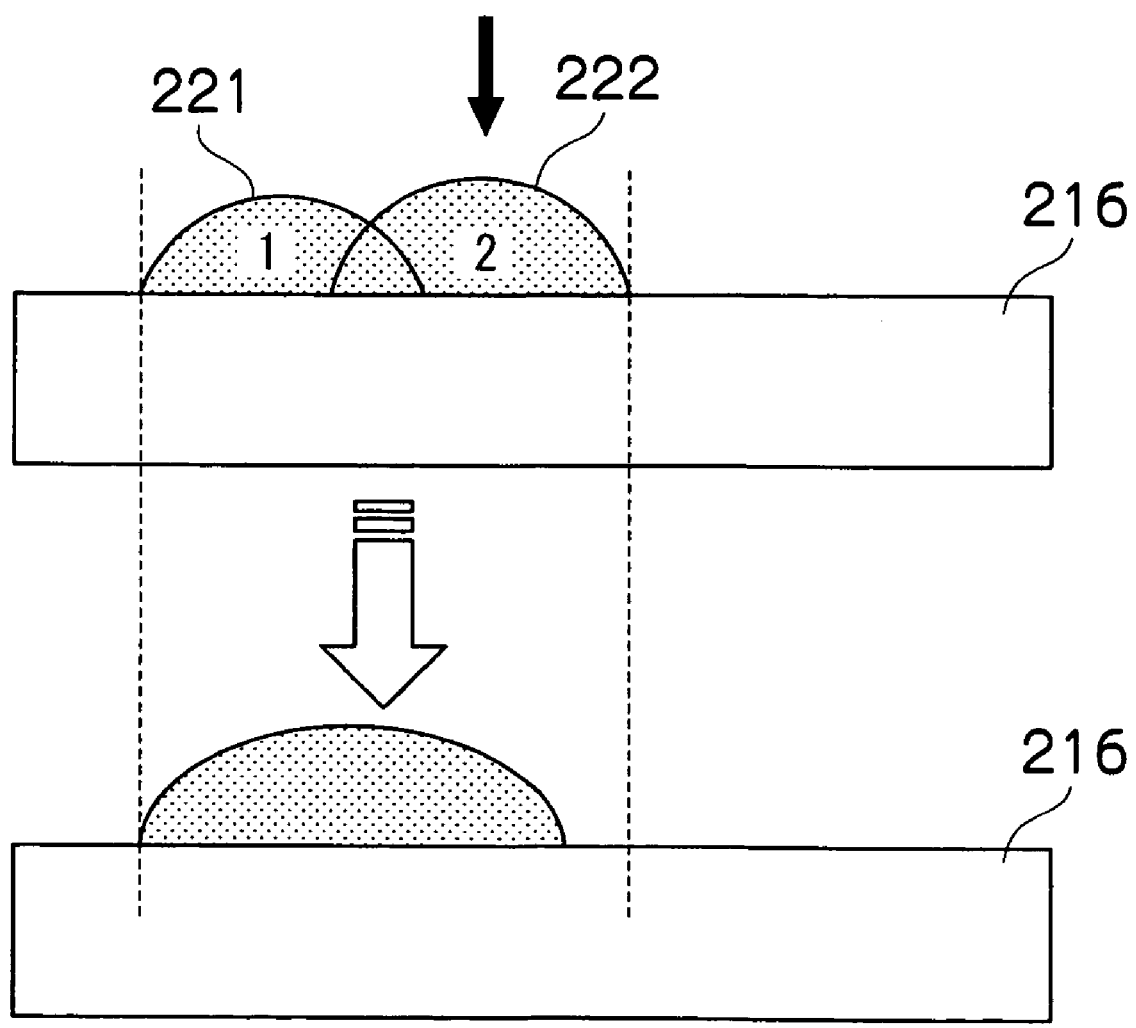
FIG. 15 is an explanation drawing for the purpose of describing the phenomenon of droplet coalescence.
Figure 16A:
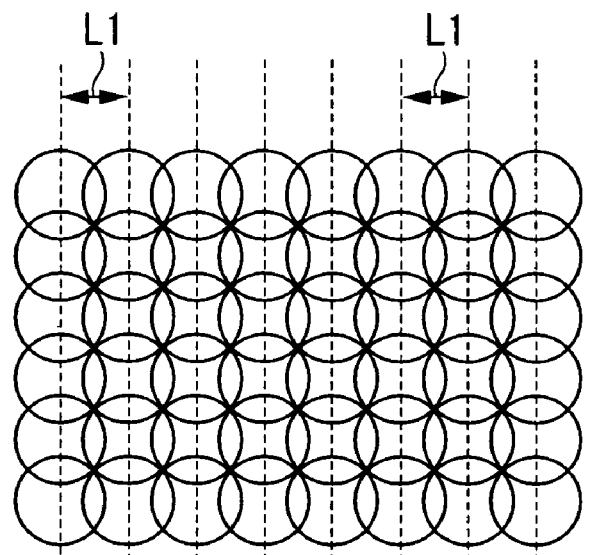
FIG. 16A is a schematic view of an ideal dot arrangement in solid printing (the target droplet ejection positions in the drive control sequence) by means of the conventional head shown in FIG. 14A.
Figure 16B:
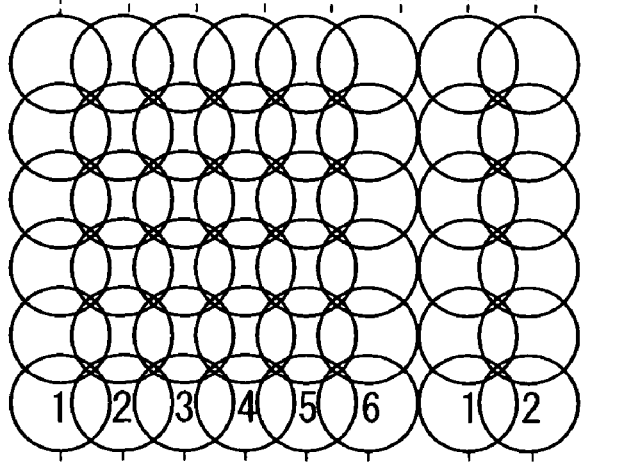
FIG. 16B is a schematic view showing the respective dot positions after the droplets have moved on the recording medium due to the aforementioned droplet coalescence phenomenon.
Figure 16C:
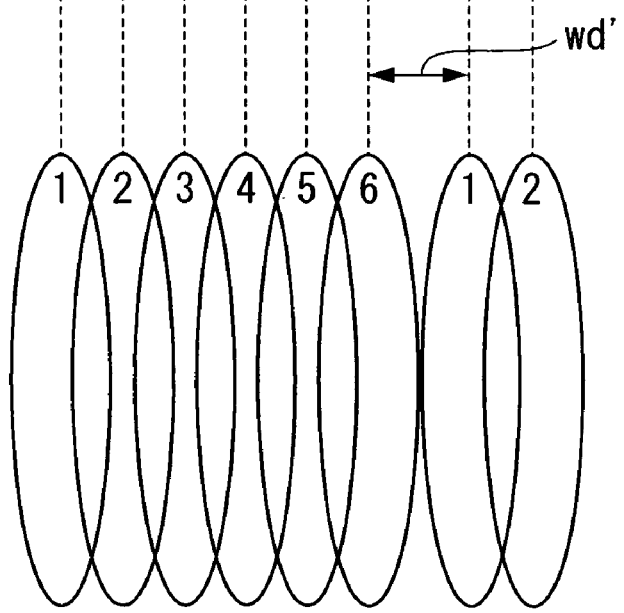
FIG. 16C is a schematic view showing the results of coalescence of a group of dots in the same column in the paper conveyance direction (the sub-scanning direction)
Figure 17:
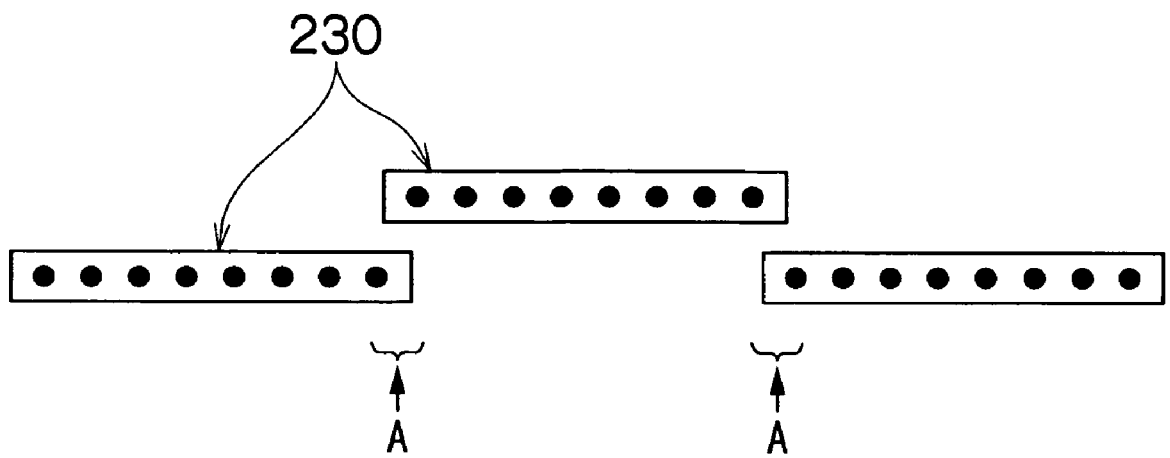
FIG. 17 is a schematic plan view showing an example of the composition of a long head.

As is clear from a comparison with the conventional structure shown in FIG. 14A, in the head 50 according to the present example shown in FIG. 6A, a composition is adopted in which the pitch L1' in the main scanning direction between the nozzle 51A-6 and the nozzle 51B-1, which corresponds to the boundary region of the nozzle blocks (the nozzles 51A-i and the nozzles 51B-i, where i=1, 2, ..., 6), (the interval between substantially adjacent nozzles that eject droplets to form adjacent dots in the main scanning direction) is narrower than the pitch L1 between other nozzles in the main scanning direction (i.e., L1'<L1).

In other words, a nozzle arrangement is adopted in which the distance in the main scanning direction between nozzles that produce a longer droplet ejection time interval (difference in landing times) between mutually adjacent dots than those between the other dots, when a dot row in one line extending in the main scanning direction at maximum dot density is formed, is made shorter than the pitch between the other nozzles.

In the present embodiment, L1' is set to a value that reduces unevenness to a minimum in a solid printing region where droplets are ejected to form dots at a rate of substantially 100%. According to the experiments, it is desirable that L1' falls within 50% to 70% of L1.

In a head 50 having the nozzle arrangement of this kind, if sub-scanning is performed along with sequential ejection driving (main scanning) from the nozzles at one end (nozzles 51A-1, 51B-1, ...) toward the nozzles at the other end (nozzles 51A-6, 51B-6, ...) of each nozzle block, then the dot arrangement such as that shown in FIG. 6B is achieved.

Figure 7A:
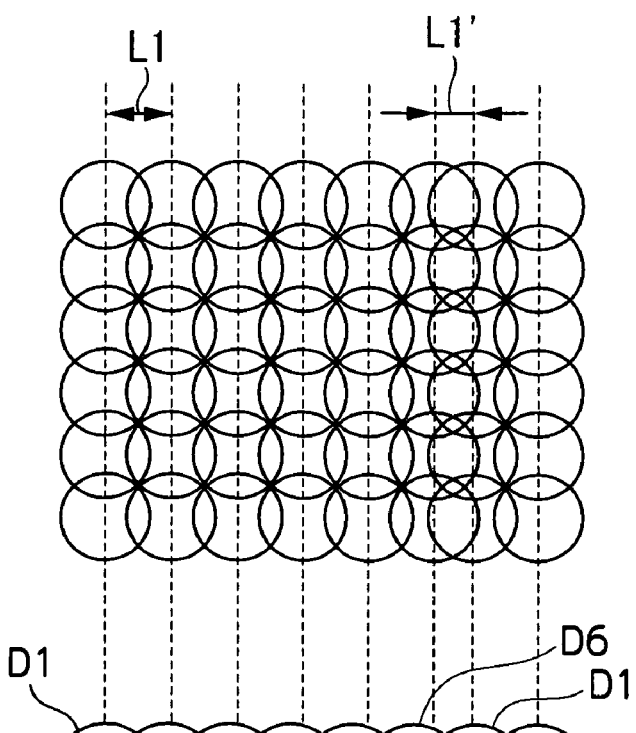
FIG. 7A is a schematic view of an ideal dot arrangement in solid printing (namely the target droplet ejection positions in the drive control sequence)
Figure 7B:
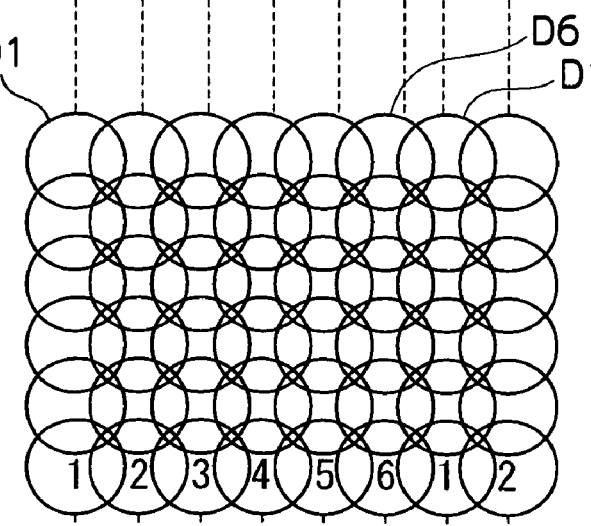
FIG. 7B is a schematic view showing the dot arrangement after the droplets have moved due to the coalescence.
Figure 7C:
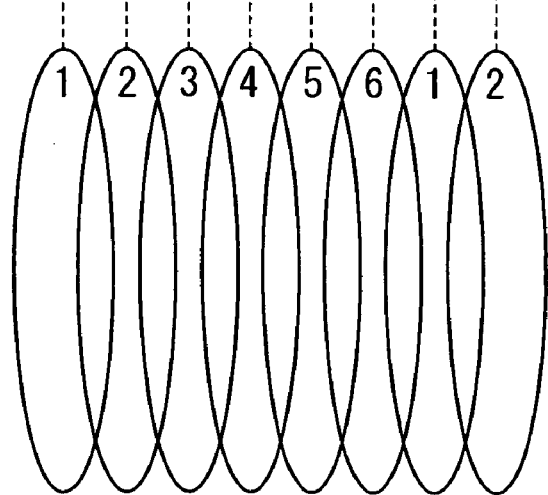
FIG. 7C is a schematic view showing a schematic view of the results of coalescence of a group of dots in the same column aligned in the paper conveyance direction (the sub-scanning direction)

FIG. 7A is a schematic view of an ideal dot arrangement in solid printing (the droplet ejection target positions in the drive control sequence). FIG. 7B is a schematic view showing the dot positions after the droplets have moved on the recording medium due to the aforementioned droplet coalescence phenomenon. FIG. 7C is a schematic view showing the results of coalescence of a group of droplets deposited in the same column in the paper conveyance direction (the sub-scanning direction).

The droplets forming the dot numbers 2 to 6 in FIG. 7B ejected by the nozzles 51A-j and 51-Bj shown in FIG. 6A (where j=2 to 6) are attracted to the droplets deposited adjacently to the left-hand side thereof, and unite with same. However, since the nozzles 51A-1 and 51B-1 are driven initially in each nozzle block when the nozzles are driven in the main scanning action, then the droplets forming the dots D1 (dot number "1") ejected by the nozzles 51A-1 and 51B-1 land before the droplets forming the dots D6 (dot number "6") on the left-hand side thereof, and the degree of the fixing of dots D1 exceeds that of the dots D6.

In other words, the difference in landing times between the dot D1 and the dot D6 arranged adjacently to the left-hand side of D1, is longer than the difference in landing times between other dots, and the droplet forming the dot D1 does not move to the left-hand side. As shown in FIGS. 6A and 6B, in the present example, the pitch L1' between the two nozzles (51A-6 and 51B-1) that have the longest interval between droplet ejection times is made to be smaller than the pitches L1 between the other nozzles. Thus, as shown in FIG. 7C, the distance wd between dots D6 and D1 on the recording medium is reduced, and striped unevenness becomes inconspicuous, compared to a composition where the nozzle-to-nozzle pitch is set to uniform interval of L1 between all of the nozzles (see FIGS. 14A and 14B, and FIGS. 16A to 16C).

As described above, in a high-density recording region in which mutually adjacent dots in the main scanning direction overlap partially and where the droplet coalescence phenomenon occurs, the nozzle arrangement in FIG. 6A (where L1'<L1) is effective in terms of reducing unevenness.

Figure 18A:
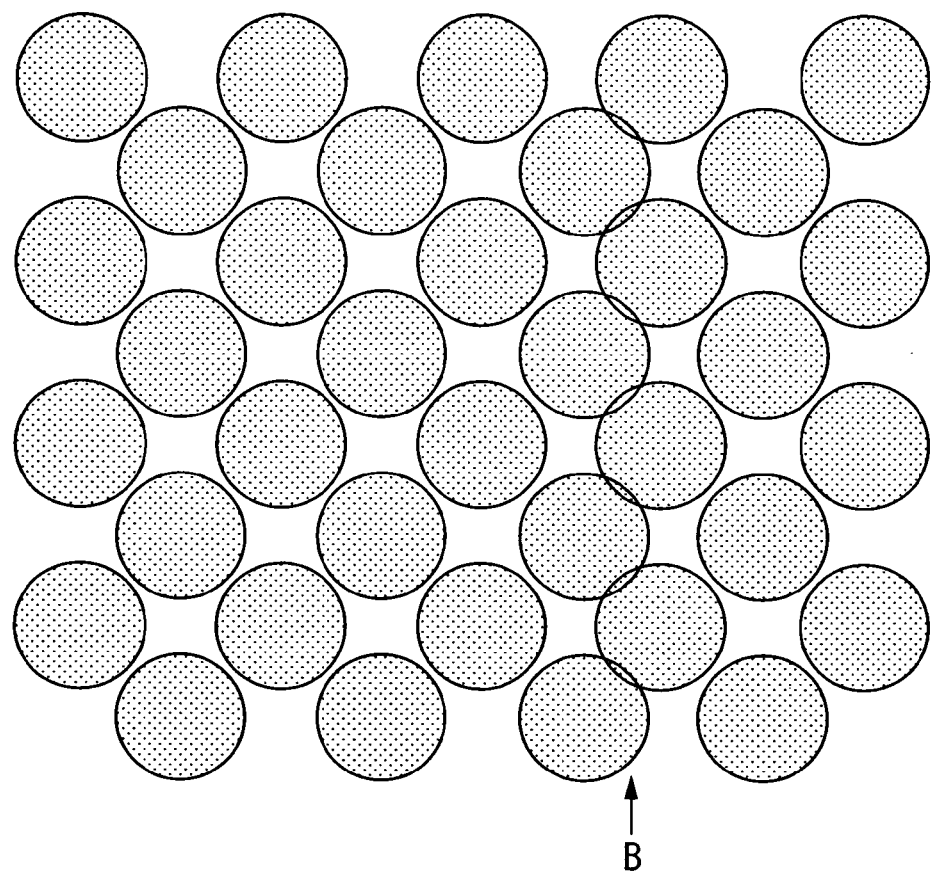
FIG. 18A is a schematic view showing one example in which non-uniformity in density occurs in a low-density region.
Figure 18B:
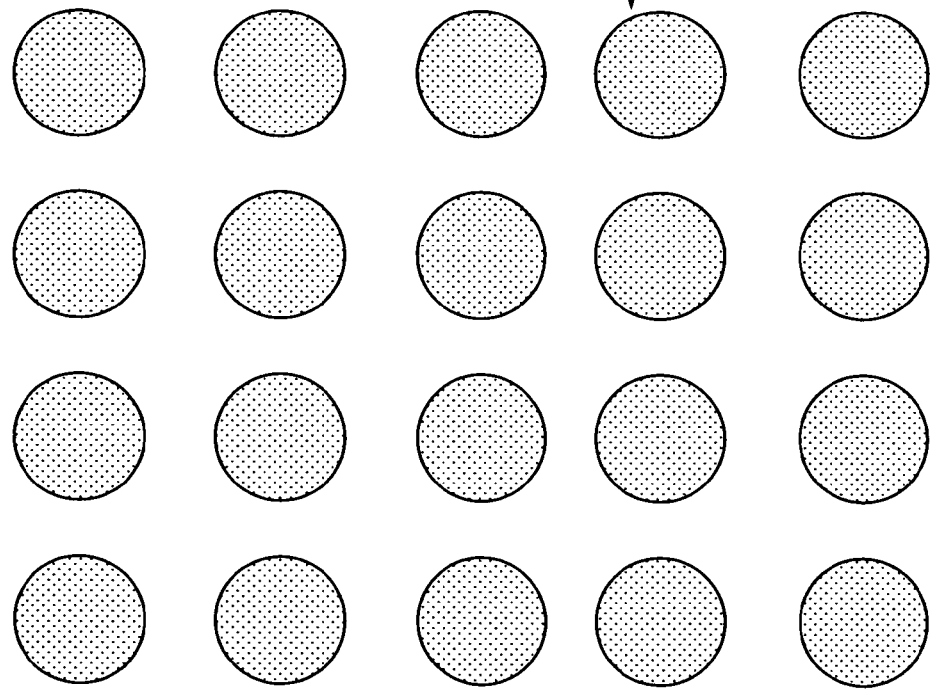
FIG. 18B is a schematic view showing a further example in which non-uniformity in density occurs in a low-density region.

On the other hand, the head 50 having the nozzle arrangement such as that shown in FIG. 6A might cause uneven density in low-density regions, as shown in FIGS. 18A and 18B.

Figure 8:
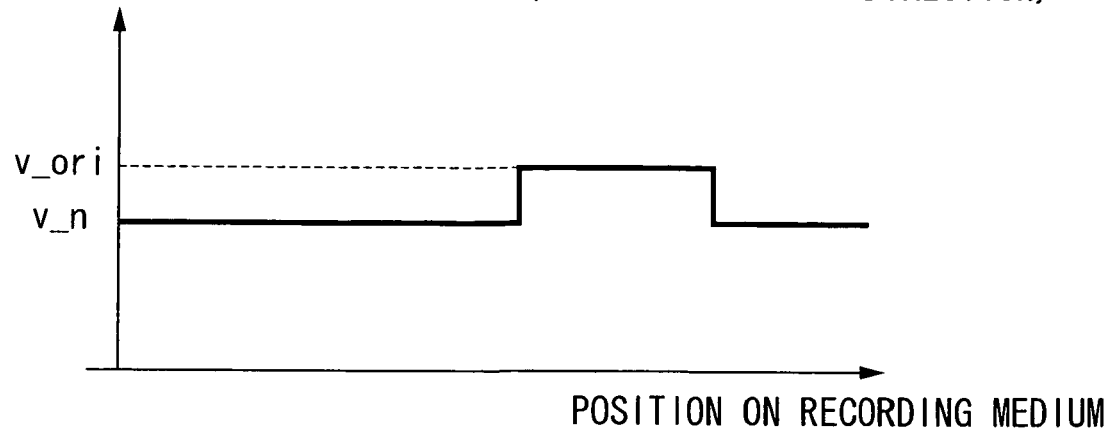
FIG. 8 is a graph showing the ink quantity per unit length in the main scanning direction in a dot arrangement in a low-density region.

FIG. 8 is a graph showing the quantity of ink per unit length in the main scanning direction in a low-density dot arrangement described with reference to FIGS. 18A and 18B. In FIG. 8, the abscissa corresponds to the position on the recording medium in the main scanning direction.

As shown in FIG. 8, if a low-density region is recorded without correcting the ink quantity, then the ink quantity v_ori per unit length in the return section of the head where the nozzle-to-nozzle pitch is L1' is greater than the ink quantity v_n per unit length in the normal section of the head where the nozzle-to-nozzle pitch is L1.

In order to reduce unevenness produced by difference in density of this kind, in the inkjet recording apparatus 10 according to the present embodiment, the ink quantity data are corrected in such a manner that unevenness at the return sections is reduced to a minimum. In low-density areas, it is necessary to implement correction of the ink quantity data so as to reduce the ink quantity. Furthermore, even in high-density areas, this correction is also effective in terms of achieving high-precision correction.

Method for Correcting Ink Quantity Data

Next, a method for correcting the ink quantity data is described. Ink quantity data on each pixel is created from the image data on the image to be printed (original image data). The term "ink quantity" here means the ejected amount of ink of each of the colors (six colors if counting light ink colors) concerning each pixel (the picture element in the printer control procedure). After the ink quantity data on the pixels corresponding to the return sections in the nozzle arrangement are corrected, half-toning process is carried out on the basis of the corrected ink quantity data, and then dot data is generated.

More specifically, taking the correction coefficient to be X, the input ink quantity data (before the correction) to be V, and the ink quantity data after the correction to be V', then the ink quantity data for the pixels to be formed by droplets ejected from the nozzles in the return sections are corrected by means of the following equation (1):

$$V' = X \times V. \tag{1}$$

In a low-density region, more preferably in a range from low-density to medium-density, correction of the ink quantity data is performed to reduce the ink quantity on the basis of a correction coefficient X satisfying 0<X<1. Then, a half-toning process is carried out.

Consequently, the dots formed by droplets ejected by these nozzles are reduced in terms of the liquid droplet volume and/or the number of droplets ejected (duty) in accordance with the correction coefficient X, compared to the normal nozzles. The details are dependent on the employed half-toning method.

Figure 9:
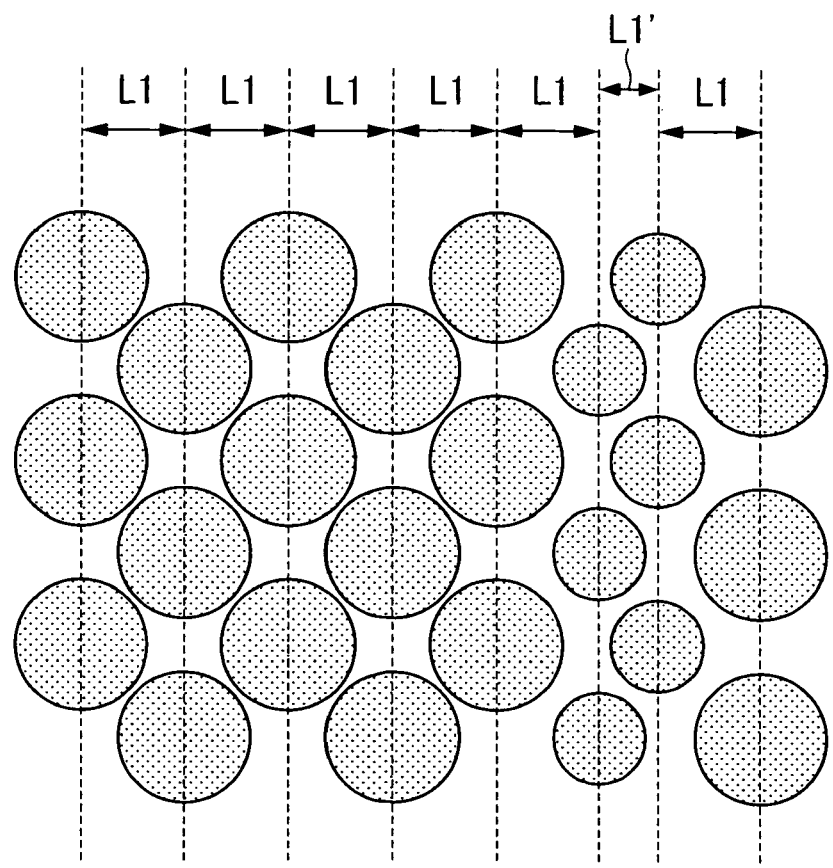
FIG. 9 is a view showing an example of a dot arrangement in a case where the liquid droplet volume is corrected by correcting the ink quantity data at a return section.

FIG. 9 is a view showing an example of a dot arrangement in a case where the liquid droplet volume has been corrected. In FIG. 9, correction is performed with respect to two nozzles at a return section (the nozzles 51A-6 and 51B-1 in FIG. 6A). However, the correction may be performed with respect to only one of the two nozzles.

Figure 10:
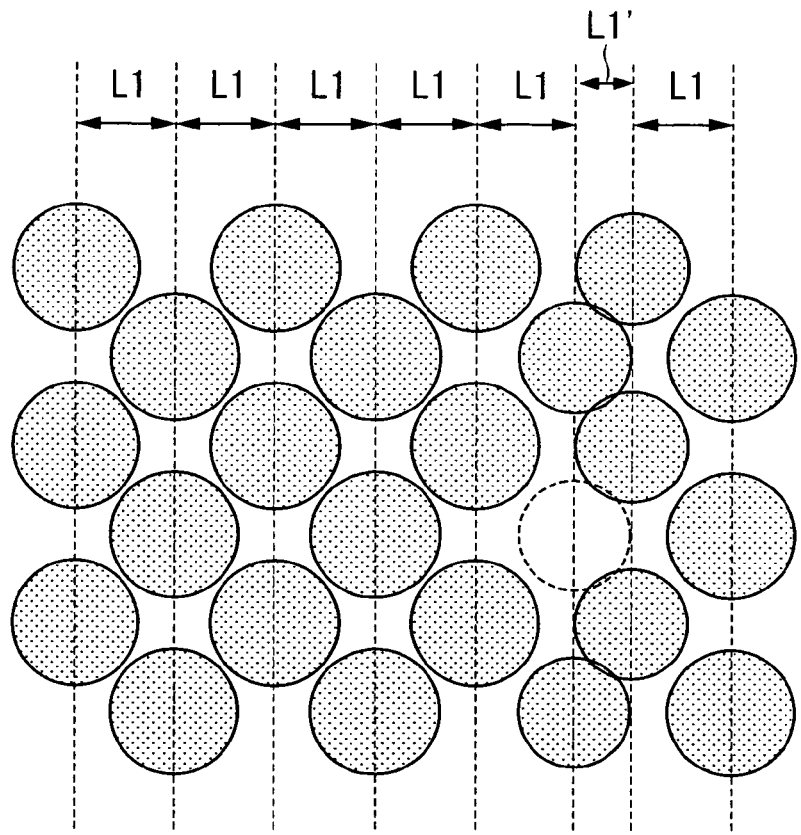
FIG. 10 is a view showing an example of a dot arrangement in a case where the recording density is corrected in accordance with the ejection duty.

FIG. 9 shows an example in which the liquid droplet volume has been corrected. However, in implementing the present embodiment, a mode is possible in which the recording density is corrected by adjusting the droplet ejection duty concerning at least one of the two nozzles at a return section, as shown in FIG. 10.

Desirably, a correction coefficient X determination table corresponding to the ink quantity is used to determine the correction coefficient X. In particular, if the ink quantity normalized to a continuous value ranging from 0 to 1 is 0.5 or lower, and more preferably, 0.3 or lower, then a correction coefficient X is determined by the following equation (2):

$$X = 1/2 + L1'/(2 \times L1). \tag{2}$$

The ink quantity normalized to a value ranging from 0 to 1 is defined in the following manner. Namely, taking D to be the optical density measured when all of the pixels in printer-control are given an ink quantity value V and printed, and Dmax to be the maximum density of the printer, the ink quantity V at which D becomes Dmax (D=Dmax) will be 1.

The derivation of the aforementioned equation (2) is explained below. The correction coefficient X should be determined in such a manner that the ink quantity per unit length in the main scanning direction (the lengthwise direction of the print head) in the normal sections is substantially equal to that in the return sections. This can be determined uniquely, regardless of the employed half-toning method.

If the ink quantity data on a pixel is taken to be V, then the ink quantity v_n per unit length in a normal section where the nozzle-to-nozzle pitch is L1, can be expressed by the following equation (3):

$$v\_n = V/L1. \tag{3}$$

Furthermore, the ink quantity v_ori per unit length in the return section where the nozzle-to-nozzle pitch is L1', can be expressed by the following equation (4):

$$v\_ori = (V + 2 \times X \times V)/(2 \times L1 + L1'). \tag{4}$$

The ink quantity should be corrected in such a manner that the value of v_n expressed by the equation (3) and the value of v_ori expressed by the equation (4) are equal to each other. Thus, the correction coefficient X is as expressed in the equation (2).

When the ink quantity normalized to a range between 0 and 1 is equal to or less than substantially 0.5 (more preferably equal to or less than 0.3), then there is no mutual overlap between dots on the recording medium because the dot density is low, and the droplet coalescence does not occur. In this case, since the pitch L1' in the main scanning direction in the return section is reduced in comparison with the pitch L1 in the normal section, the quantity of ink ejected per unit area thereby increases in the return section in the nozzle arrangement if no correction is performed. By employing the correction coefficient X expressed in the equation (2), the ink quantity in the return section is made substantially equal to that in the normal section, and the line-shaped unevenness is considerably reduced.

Figure 11:
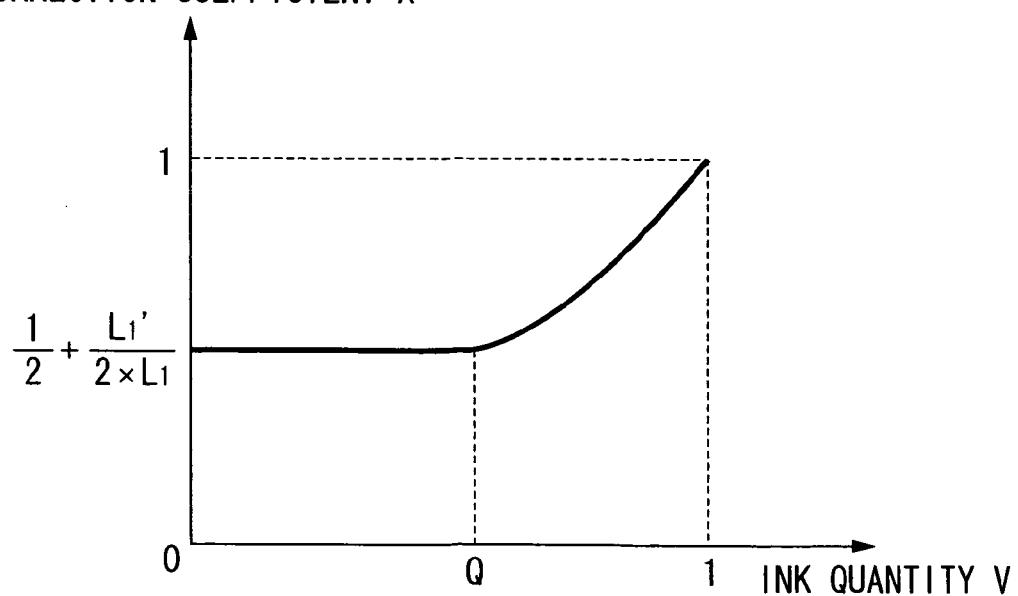
FIG. 11 is a graph showing an example of the correction coefficient X determined in accordance with the normalized ink quantity.

FIG. 11 is a graph showing the correction coefficient X corresponding to the normalized ink quantity. In FIG. 11, the abscissa indicates the ink quantity V normalized to a range between 0 and 1, the ordinate indicates the correction coefficient X, and "Q" indicates the value of the ink quantity data at which droplets ejected onto the recording medium start to make contact with each other. In the present example, Q is substantially 0.5. In an actual device, a correction coefficient X determination table defining the relationship shown in FIG. 11 is used.

As stated above, in the region where the normalized quantity of ink is substantially 0.5 or lower, the correction coefficient X expressed by the equation (2) is used. On the other hand, in a medium-density region where the normalized quantity of ink exceeds 0.5, the droplets start to overlap each other, and the extent of coalescence becomes progressively greater as the quantity of ink increases. Therefore, the amount of correction reduces (i.e., the correction coefficient X rises to approach 1) as the quantity of ink increases.

Furthermore, in a high-density region where the dots are arranged at high density (a density approaching maximum density) in such a manner that the droplets forming the adjacent dots overlap each other, the correction coefficient X becomes X≈1 because the non-uniformity in density is reduced due to the characteristics (L1'<L1) of the nozzle arrangement shown in FIG. 6A. It is also possible to change the correction coefficient to an optimum value in accordance with the conditions, such as the ink properties and the droplet ejection speed.

The correction coefficient X is preferably optimized by means of a feedback routine. For example, a plurality of test patterns having different densities (dot densities) are outputted, the respective optical densities of these patterns are read in by the print determination unit 24, and the non-uniformity in density in the return section is measured. A table of correction quantities is then defined on the basis of these measurement results. By repeating this routine, it is possible to create a highly accurate correction coefficient X determination table. If there is a variation in any of the conditions, such as the ink type, recording medium type, and print speed, then it is possible to optimize the correction coefficient by implementing the correction coefficient determination routine described above.

By ensuring that the initial value of the correction coefficient X determination table has the characteristics described above, the routine can be expected to rapidly converge to a particular value.

Desirably, when the test patterns are read in to determine the correction coefficient, test patterns that enable the return sections of the nozzle arrangement to be identified (for example, patterns in which droplets are ejected from the only two nozzles at the return sections) are also outputted, so that it is possible to identify the position of the return sections on the test patterns.

The aforementioned determination of the correction coefficient and correction processing are carried out with respect to the ink quantity data corresponding to the ink of respective colors (including the light inks).

Figure 12:
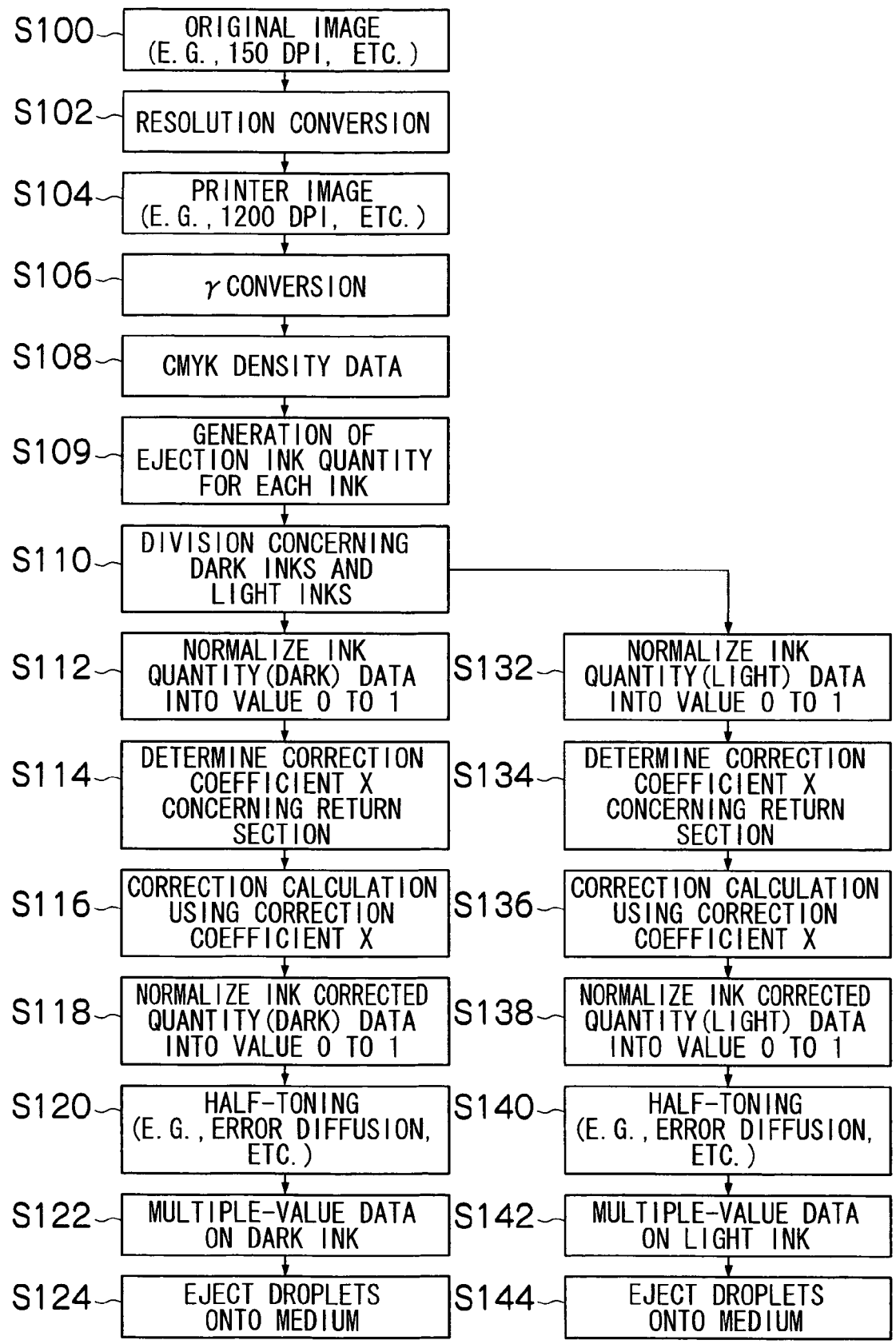
FIG. 12 is a flowchart indicating the image processing sequence of the inkjet recording apparatus.

FIG. 12 is a flowchart indicating the image processing sequence of the inkjet recording apparatus 10 according to the present embodiment.

The image data (of 150 dpi, for example) on the original image that is to be printed is inputted (step S100), and the resolution conversion concerning this image is conducted in accordance with the output resolution of the printer (the inkjet recording apparatus 10 in the present embodiment) (step S102), whereby a printer image (of 1200 dpi, for example) having a pixel-size suitable for the resolution of the printer is generated (step S104).

Then, the printer image is subjected to γ conversion (step S106), and density data in pixel units is generated for printing by the printer (step S108). For example, it is converted into density data on the respective colors, C, M, Y and K. The density data here is data expressed as a density gradation for each pixel.

The procedure in steps S100 to S108 is data processing steps that are executed in a general printer. Concerning the resolution conversion process (step S102), the γ conversion process (step S106), and the process for generating density data including color conversion (step S108), it is possible to change the order of the processes.

Then, the CMYK density data generated at step S108 is converted to ink ejection quantity data for each ink (step S109).

When a combination of dark inks and light inks are used as in the present embodiment, the density data is distributed among the dark and light inks (step S110), and correction and half-toning are carried out with respect to the ink quantity data on the respective dark inks and light inks (steps S112 to S124, and steps S132 to S144).

More specifically, the ink quantity data on the dark ink is normalized to a continuous value between 0 and 1 (step S112), and the correction coefficient X is determined in accordance with the normalized ink quantity data, in respect of at least one of the two pixels formed by droplets ejected from the nozzles corresponding to the return section in the nozzle arrangement (step S114). The correction coefficient X determination table described with reference to FIG. 11 is used in the determination of the correction coefficient X.

Then, the ink quantity data is corrected by multiplying the ink quantity data on the pixels corresponding to the return section by the correction coefficient X (step S116), whereby the corrected ink quantity data (normalized to a continuous value between 0 and 1) for the dark inks is obtained (step S118).

A half-toning method is applied to the corrected ink quantity data (step S120), whereby multiple-value dot data is generated (step S122). The driving of the actuators 58 of the head 50 is controlled on the basis of the multiple-value data thus obtained, and droplets are ejected onto the recording medium (step S124).

Similarly, in respect of the light inks, the ink quantity data on the light ink is normalized to a continuous value between 0 and 1 (step S132), and the correction coefficient X is determined in accordance with the normalized ink quantity data, in respect of at least one of the two pixels formed by droplets ejected from the nozzles corresponding to the return section (step S134).

Then, the ink quantity data is corrected by multiplying the ink quantity data on the pixels corresponding to the return section by the correction coefficient X (step S136), whereby the corrected ink quantity data (normalized to a continuous value between 0 and 1) for the light inks is obtained (step S138).

A half-toning method is applied to the corrected ink quantity data (step S140), whereby multiple-value dot data is generated (step S142). The driving of the actuators 58 of the head 50 is controlled on the basis of the multiple-value data thus obtained, and droplets are ejected onto the recording medium (step S144). Thereby, it is possible to reduce line-shaped unevenness from the high-density regions through to the low-density regions.

Figure 13:
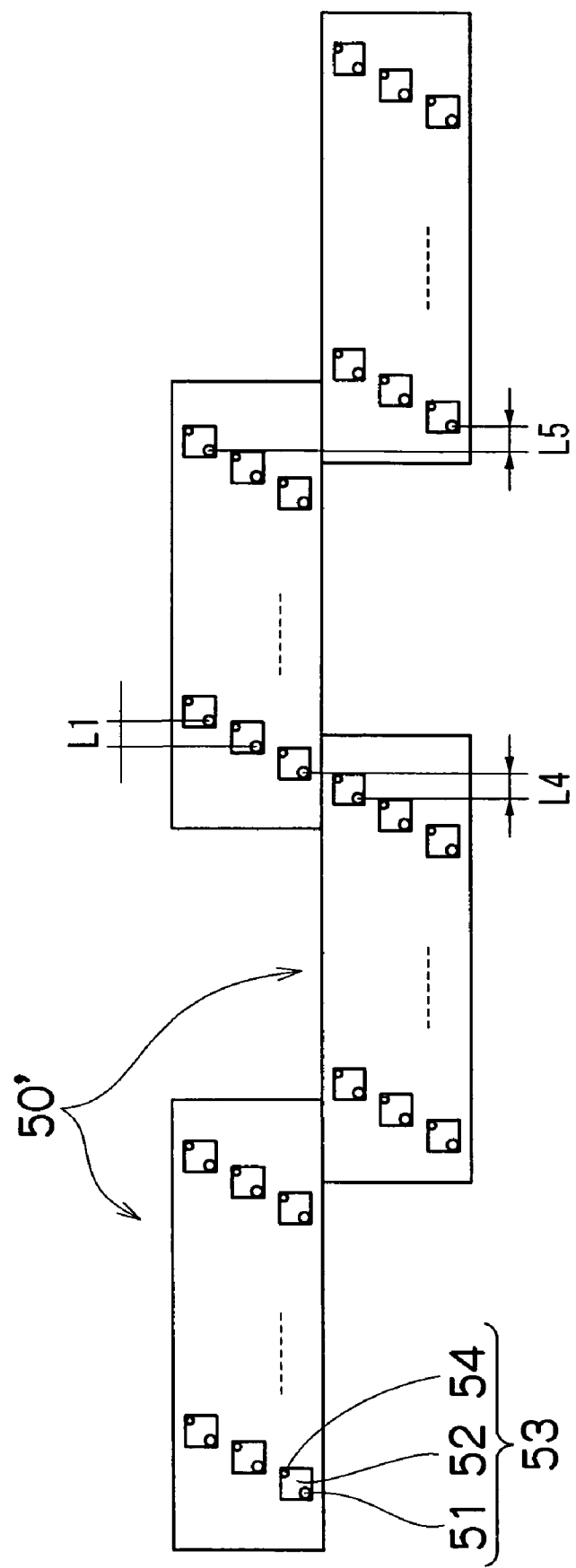
FIG. 13 is a planar perspective view showing a further example of the composition of a full line head.

In the aforementioned embodiment, a long matrix head such as that shown in FIG. 2A is described. However, in putting the present invention into practice, the structure of the head and the nozzle arrangement are not restricted to the illustrated embodiments. For example, as shown in FIG. 13, a line head having nozzle rows of a length corresponding to the entire width of the recording paper 16 can be formed by arranging and combining, in a staggered matrix, short head units 50' each having a plurality of nozzles 51 arrayed in a two-dimensional fashion, instead of the composition in FIG. 2A.

In this case, in addition to adopting a similar structure to that in FIG. 6A in respect of the matrix-shaped nozzle arrangement in the head unit 50', the pitches L4 and L5 in the main scanning direction between the nozzles corresponding to joint sections between the short head units 50' are smaller than the pitch L1 between other nozzles (i.e., L4<L1, L5<L1) in view of the difference between the ink droplet landing times, and the ink quantity data is corrected by a similar method to that described above in respect of the pixels corresponding to these joint sections.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:
   a conveyance device which performs relative movement of an ejection head and a recording medium by conveying at least one of the ejection head and the recording medium in a uniform relative movement direction;
   the ejection head which includes ink ejection ports two-dimensionally arranged, the ejection head performing an ink ejection operation of ejecting ink droplets through the ink ejection ports toward the recording medium in conjunction with the relative movement performed by the conveyance device so as to compose a line-shaped dot row in a main scanning direction substantially perpendicular to the relative movement direction from dots formed by the ink droplets deposited on the recording medium, adjacent two of the dots being arranged to overlap at least partially with each other, one of pairs of adjacent two of the ink ejection ports being a maximum-landing-time-difference pair where a landing time difference between the adjacent two of the dots arranged in the line-shaped dot row is maximum, a pitch in the main scanning direction between the maximum-landing-time-difference pair being smaller than pitches in the main scanning direction of others of the pairs of adjacent two of the ink ejection ports;
   an ink quantity data generation device which generates ink quantity data on pixels from image data on print object;
   an ink quantity data correction device which corrects the ink quantity data on at least one of the pixels to be formed by the ink droplets ejected from at least one of the ink ejection ports of the maximum-landing-time-difference pair, in accordance with the ink quantity data generated by the ink quantity data generation device; and
   an ejection control device which controls the ink ejection operation of the ejection head in accordance with the ink quantity data on the pixels including the ink quantity data having been corrected by the ink quantity data correction device.

2. The image forming apparatus as defined in claim 1, wherein the ink quantity data correction device has a correction coefficient table for determining a correction coefficient corresponding to the ink quantity data on the pixel to be corrected.

3. The image forming apparatus as defined in claim 2, further comprising:
   a test pattern output device which controls the ejection head and the conveyance device in such a manner that a prescribed test pattern is printed on the recording medium;
   an image reading device which reads in print results of the test pattern on the recording medium; and
   a table rewriting device which rewrites the correction coefficient table in accordance with information read in by means of the image reading device.

4. The image forming apparatus as defined in claim 1, wherein the ink quantity data correction device corrects the ink quantity data in a range from low-density regions to medium-density regions in accordance with the following equation:

$$V' = X \times V,$$

where V is normalized ink quantity data before correction, X is the correction coefficient satisfying 0<X<1, and V' is normalized ink quantity data after the correction.

5. The image forming apparatus as defined in claim 1, wherein:
   if a normalized ink quantity value obtained from the ink quantity data on the pixel to be corrected by normalizing into a range between 0 and 1 is not more than 0.5, then the ink quantity data correction device determines a correction coefficient X and corrects the ink quantity data in accordance with the following equations:

$$X = 1/2 + L1'/(2 \times L1),$$

and $$V' = X \times V,$$

where L1' is the pitch in the main scanning direction between the maximum-landing-time-difference pair of the ink ejection ports, L1 is the pitch in the main scanning direction of the others of the pairs of the ink ejection ports, V is normalized ink quantity data before correction, and V' is normalized ink quantity data after the correction.

6. The image forming apparatus as defined in claim 1, wherein:
   the ink ejection ports are arranged in a matrix configuration aligned in a row direction substantially perpendicular to the relative movement direction and in a column direction oblique to the row direction, and are divided into a plurality of blocks being aligned in the column direction; and
   the line-shaped dot row extending in the main scanning direction is formed by conducting an ejection driving for each of the plurality of blocks successively from the ink ejection port at one end side of each block toward the ink ejection port at the other end side of each block.

7. The image forming apparatus as defined in claim 6, wherein the maximum-landing-time-difference pair of the ink ejection ports spans a boundary between adjacent two of the blocks.

8. The image forming apparatus as defined in claim 1, wherein a volume of the ink droplet ejected from the at least one of the ink ejection ports of the maximum-landing-time-difference pair is adjusted in accordance with the ink quantity data on each pixel including the ink quantity data having been corrected by the ink quantity data correction device.

9. The image forming apparatus as defined in claim 1, wherein an ejection duty of the ink droplets ejected from the at least one of the ink ejection ports of the maximum-landing-time-difference pair is adjusted in accordance with the ink quantity data on each pixel including the ink quantity data having been corrected by the ink quantity data correction device.

* * * * *